(12) United States Patent
Gurnani et al.

(10) Patent No.: US 9,384,486 B2
(45) Date of Patent: Jul. 5, 2016

(54) SECURE FINANCIAL PAYMENT

(71) Applicant: Verizon Patent and Licensing Inc., Arlington, VA (US)

(72) Inventors: Roger Gurnani, Far Hills, NJ (US); John C. Martin, Stamford, CT (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 163 days.

(21) Appl. No.: 14/331,628

(22) Filed: Jul. 15, 2014

(65) Prior Publication Data
US 2016/0019547 A1    Jan. 21, 2016

(51) Int. Cl.
*G06K 5/00* (2006.01)
*G06Q 20/40* (2012.01)
*G06Q 20/32* (2012.01)

(52) U.S. Cl.
CPC ...... *G06Q 20/40145* (2013.01); *G06Q 20/3223* (2013.01)

(58) Field of Classification Search
USPC ............................................ 235/380; 705/44
See application file for complete search history.

(56) References Cited

U.S. PATENT DOCUMENTS

| | | | |
|---|---|---|---|
| 7,600,676 B1* | 10/2009 | Rados | G06Q 20/40 235/380 |
| 2013/0260734 A1* | 10/2013 | Jain | G06Q 30/0601 455/418 |

\* cited by examiner

*Primary Examiner* — Rafferty Kelly

(57) ABSTRACT

To improve security for processing of financial transactions on a customer's account, particularly for users of mobile devices, the examples authenticate the customer or user in an effective manner and/or transfer funds upon successful authentication, using intelligence of the customers' mobile devices. The present approach uses an identifier of the mobile device or user at the mobile device. The user is authenticated for a particular desired transaction based on some number of authentication factors, one or more of which is a biometric input. The user authentication technique, e.g. factors used and/or precision of matching of received user authentication factors to reference factors, can be varied based on a variety of parameters, such as transaction amount, time, device location, history of prior transactions or history of other aspects of device usage. The processing avoids storage of sensitive customer data, e.g. account number at a merchant and/or at the customer's mobile device.

19 Claims, 6 Drawing Sheets

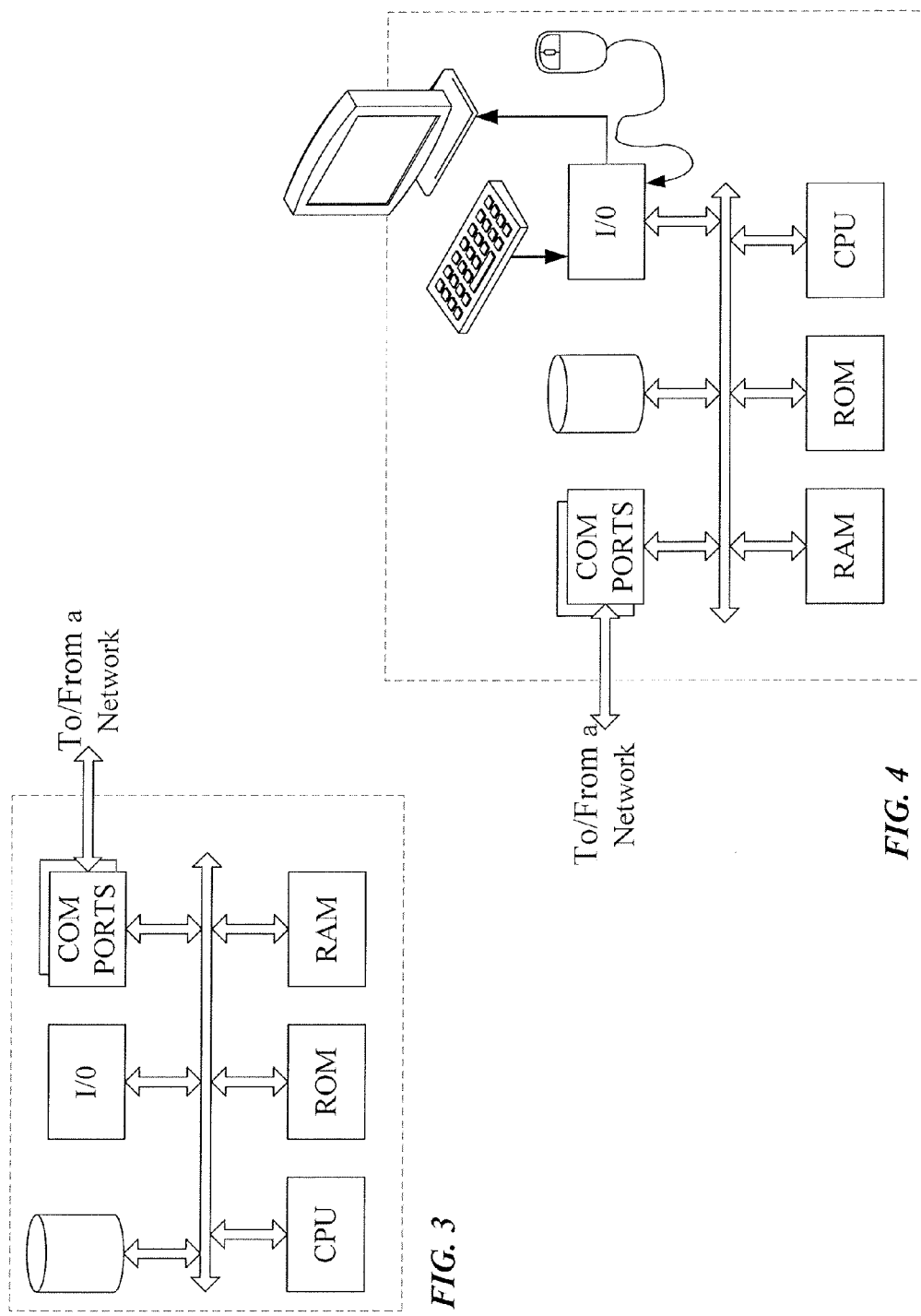

US 9,384,486 B2

SECURE FINANCIAL PAYMENT

BACKGROUND

Payment cards, such as credit cards and debit cards, are linked to accounts and enable users to make purchases using those accounts. For example, a credit card enables a user to access a line of credit from their credit card account to make purchases; and a debit card enables a user to access their bank account and transfer funds from the account to merchants' accounts, to make purchases.

With the increasing popularity of advanced intelligent types of mobile devices, such as smart phones and tablets, there is a trend toward use of mobile devices in various in-store and on-line payment transactions. Purchase transactions using mobile devices, however, require use of financial information of an existing account, such as identifiers of credit or debit card accounts. For example, several different companies have introduced mobile wallet type services that allow users to pay for goods and services even at traditional brick-and-mortar type establishments via their mobile devices. However, mobile wallet type services require input of information to identify one or more of the user's credit or debit card accounts, to be used in the actual transactions. In-app purchases from a mobile device as well as on-line purchases via a browser on the mobile device or on a traditional personal computer similarly require financial account information for use by or transfer of funds to the merchant system; and in many cases, that financial account information is stored in and sent from the mobile device.

As shown by recent security breaches at major retailers and on-line shopping services, such widespread use and distribution of financial account information creates an ever increasing security vulnerability.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 3 is a simplified functional block diagram of a computer that may be configured as a host or server, for example, to function as any of the computer platforms for servers shown in the system of FIG. 1.

FIG. 4 is a simplified functional block diagram of a personal computer or other work station or terminal device, for example for use as a work station of merchant of financial information personnel or as a home or office computer of a customer, in the system of FIG. 1.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Physical credit and debit cards and the associated financial account numbers can be stolen. To improve security, particularly for transactions of users of mobile devices, it would be useful to reduce usage of credit/debit cards as well as to reduce communication of card or other financial account numbers and the input and storage of sensitive customer data at a merchant and/or at the customer's mobile device or the like. The technologies discussed by way of example below support some of or all of those desirable advancements, by improving techniques to authenticate the customer or user in an effective manner and/or transfer funds upon successful authentication, so as to improve security yet offer a reasonable customer experience. Such improvements may also benefit the financial institutions, the merchants and the customers.

The various techniques, equipment and component configurations disclosed herein, by way of example, therefore relate to use of biometric data for user authentication and associated secure payment techniques based on communications and data transfers without transfer of an identifier or other sensitive data related to a customer or their financial account. At a high-level, the examples rely on a customers' facial image and/or other biometric data and the intelligence of the customer's mobile device, for authentication to a financial institution's system that handles the actual payment transaction. Examples are discussed for both transactions at a physical premises and on eCommerce websites.

Figure 1:
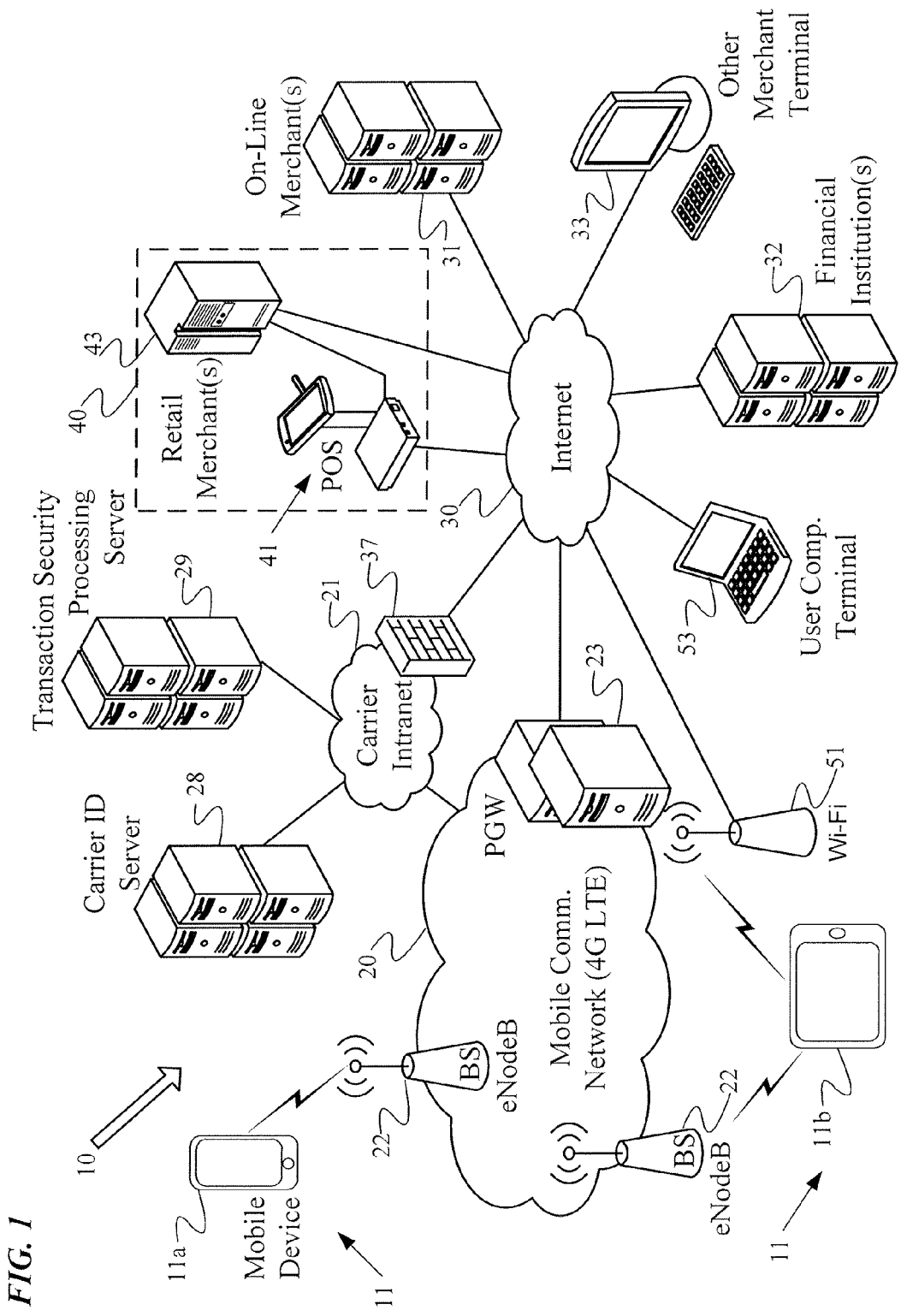
FIG. 1 is a high-level functional block diagram of an example of a system of networks and devices that provide that provide a variety of communication services, including communications in support of secure payment procedures.

Reference now is made in detail to the examples illustrated in the accompanying drawings and discussed below. FIG. 1 illustrates a functional block diagram of an example of a system 10 that supports various mobile communication services and which may implement secure payment transaction procedures involving biometric data and communications with the customer's mobile device.

The illustrated system 10 services any number of mobile devices 11, two examples of which are shown for purposes of this discussion. Mobile devices 11 may be laptops, a personal digital assistants ("PDAs"), smartphones, tablet computers, portable games or media players with wireless communication elements, or other portable devices designed to communicate via one or more wireless networks. The mobile device 11*a* in our example corresponds to a smartphone, and the mobile device 11*b* in our example corresponds to a tablet. Each of those mobile device examples 11*a*, 11*b* have network communication capability and one or more physical elements for providing a user interface. Internally, such devices typically include one or more wireless transceivers for data communication, a processor configured/connected to control device operation, a memory and programming. As discussed more later, the mobile devices 11, such as the examples shown at 11*a*, 11*b*, also include one or more physical elements for biometric input, and at least the device examples 11*a*, 11*b* are programmed or otherwise configured to perform various functions involved in secure financial payment procedures. Although not shown, there may be many other mobile devices that do not participate in secure financial payment procedures, e.g. because the users of such other devices have not subscribed to a service for payment via mobile device or to the related user authentication service discussed here.

The illustrated system example 10 includes a mobile communication network 20, in this case, operated in accordance with fourth generation (4G) Long Term Evolution (LTE)standards, although other wireless networks at least supporting data communications may be used for the secure financial payment procedures. The 4G LTE mobile network 20 in the example provides mobile telephone communications as well as Internet data communication services. For example, mobile network 20 may connect to public packet-switched data communication networks such as the Internet 30 via a packet gateway (PGW) 23. Data communications via mobile network 20 with network connected equipment, provided for users of mobile devices 11, may support a variety of services such as communications of text and multimedia messages, e-mail, web browsing, streaming or downloading content, etc.

In our discussion, the examples use packet communications via a mobile network, an Intranet and the Internet, which typically would utilize packet transport and Internet Protocol (IP). The transaction processing, here, however, may utilize other networks, other forms of network transport, and/or other protocols for the relevant communications.

For purposes of discussion of financial transactions, examples of network connected equipment with which the mobile devices 11 may communicate are represented generically by the merchant(s) server computer systems 31, and/or computer terminal equipment 33 for merchant personnel, in the drawing. The drawing also shows a financial institution(s) server computer system 32, connected to the Internet 32; however, that system 32 will typically communicate business-to-business and may or may not communicate directly with mobile devices 11 or other end user terminal equipment, depending on the various technologies that the involved enterprise choose to set-up for the user authentication and secure payment functions. Voice communication also may involve transport via the Internet 30 using voice over Internet Protocol (VoIP) technologies; although additional networking equipment (not shown) may be provided for separate voice transport, e.g. if the network 20 utilizes wireless communication technologies offering traditional 'circuit' switched transport for voice telephone type services. Each mobile device 11 may wirelessly 'connect' to mobile network 20 through a cellular base station 22, two of which appear in the drawing by way of example.

For convenience only, the drawings and description use terms like base station (BS) originally developed to describe elements of older mobile network technologies. The terms are used here, however, in a broader sense to also encompass equipment used for similar wireless link and routing/control purposes in more modern network technologies. In a 4G wireless network, for example, each wireless access node corresponding to one of the illustrated base stations may take the form of a node referred to as an eNodeB, and the wireless mobile devices are types of user equipment (UE) devices. Packet routing and control functions may be implemented in packet routers and/or associated server platforms in the radio access network (RAN) or in many cases in elements of an IP Multimedia Service (MS) core network (not shown separately) coupled to some number of 4G LTE type RANs, although such routing and control element(s) are generically included in the broad class of devices that may be used to implement the functionality of network 20 discussed here.

The transactions under consideration here enable payment for goods or services that users of mobile devices 11 make through interactions with various types of merchants. No physical credit cards or debit cards or account numbers are used in the interaction between the device users/customers and the merchants. No customer financial information is given to, transmitted to or stored at the merchant, and the mobile devices do not need to store or transmit account specific identifiers or the like. Hence, in our example, the secure transaction processing entails user authentication by a transaction security processing server 29 and communication of transaction information and authentication results to a server 32 of a financial institution that handles the customer accounts and implements the actual payment transactions with systems of the merchants.

Although shown as separate systems operated by different enterprise entities, the transaction security processing server 29 and the financial institution server 32 may be operated by the same entity and possibly even be hosted on the same computer hardware platform. The illustrated example, however, represents a business model in which the carrier operating the mobile communication network 20 provides the user authentication functionality for payment transaction security via the transaction security processing server 29 and one or more financial institutions manage the customer financial accounts and all related funds transfers. The present concepts, however, may be applied where one of those enterprises performs both the financial and security related functions. For example, if the actual payments might entail charges against the mobile customer's prepaid or postpaid account with the carrier that operates the mobile communication network 20, then the carrier would operate a billing system to perform functions analogous to those of the financial institution server 32 and would operate the transaction security processing server 29. Theoretically, in any of the different business models, the processes implemented on the two servers in the diagram could run on one platform, although the example implements the server functions 29 and 32 on different computers, to handle significant transaction volume and/or to reduce possible security vulnerabilities with respect to the sensitive financial account information.

The carrier that operates the network 20 will also utilize a variety of other systems for related purposes, such as network maintenance, accounting and provisioning. In the example, the carrier has another data network, e.g. Intranet 21, that provides data communications for other data systems used by the carrier; and that network 21 has connectivity into the network 20 that provides the actual communications services to the carrier's customers. Examples of carrier systems that reside in or communicate via the Intranet 21 include systems for maintaining account records and for processing of network usage data for billing purposes. For purposes of the present discussion, equipment communicating via the network 21 includes a customer/device identification (ID) server 28 generally representing any of the carrier's system(s) that may provide data useful for user authentication purposes based on mobile device identification, in some of the examples of secure transaction processing discussed below. There may be one or more computer platforms to perform the functions of the server 28.

For the carrier-centric business model for user authentication, represented in the drawing figure, the carrier equipment communicating via the network 21 also includes the transaction security processing server 29 that will be involved in the authentication of a device user for the secure payment solution. The transaction security processing server 29 entails, for example, a server program framework and associated sever application software, executing on a network connected computer. Although shown as a single hardware platform, for convenience, the functionality of the transaction security processing server 29 may be implemented on some larger number of network connected computers, e.g. to provide redundancy and/or to handle a particular expected peak volume of transactions.

During user authentication operations for secure payment transactions, the secure payment transaction processing of the server 29 communicates with participating mobile devices, such as 11*a* and 11*b*, and communicates with one or more financial institution severs 32. In the example, the secure payment transaction processing of the server 29 is a service offered by the carrier that operates the mobile network 20, therefore the server 29 is implemented on a computer platform connected to the carrier's Intranet 21 or may be implemented as an application server in the IMS portion of the network 20. Of course, the functionalities of the transaction processing of the server 29 may be offered by other enterprises and therefore involve use of server computers connected to the Internet 30 or other appropriate networks, e.g. if operated by a mobile equipment or software vendor, a financial clearinghouse entity, one or a group of financial institutions, a governmental body, etc.

Since the mobile network operator/carrier provides the transaction verification service, the server 29 may have access to other device or mobile account records of the carrier for verification, e.g. on servers generally represented in our example by the carrier ID server. The server 29 therefore can access such records to verify authentication of the particular device 11. For example, if the transaction security processing server 29 receives both the mobile directory number (MDN) and the electronic serial number (ESN), the server can access the appropriate device record in server 28 to validate those identifiers and to confirm that the MDN is currently assigned to the mobile device 11 having the hardware ESN, in a manner analogous to validating a mobile device for network operations before allowing the device to launch a user-desired communication through the network 20. The record for the device 11 in the server 28 may also enable the transaction security processing server 29 to validate that the particular device 11 is authorized to use the security service of the transaction security processing server 29.

At least some systems of the carrier, such as the server 29, communicate with systems of other entities. As will be more apparent from discussion of the detailed examples below, at least some operations of the secure payment transaction processing server involve communications with servers outside the network, particularly with servers 32 of one or more financial institutions. Although other networks may be used, the example shows such communications via the Internet 30. Hence, the Intranet 21 is connected to the Internet 30 via routing and protective gear generally represented by the firewall 37.

The financial institution sets rules for secure payment transactions on behalf of its customers with respect to its customers' accounts. The rule sets determine the factors used and the degree of precision of analysis of received factors needed to authenticate a current device user as a valid user/customer with respect to a financial account involved in a payment transaction. Rules sets to be applied may be maintained at the financial institution's server 32 and/or at the transaction security processing server 29; although some implementations may utilize somewhat related rule sets in the mobile devices 11. The rule sets are established by or at least agreed upon with the financial institution. Different financial institutions may set different rules and different requirements (thresholds or the like) for when to apply the various rule sets.

In several examples, the rules vary between different payment transactions. Transaction differences may relate to different levels of risk, as defined by different levels of monetary value, different levels of trust or ability to recover money based on parties or products or services involved, or the like. For purposes of discussion, different transaction values and associated value thresholds are referred to herein, although the concept applies to other parameters as may be appropriate indicators of risk involved in financial transactions.

Although a later example maintains the rule sets at only one device/entity, in one example, the applicable rule set is implemented in both the mobile device 11 and the transaction security processing server 29. For example, a Secure Payment application (app 231 in FIG. 2) in the mobile device 11 may have a minimum rule set to apply to obtain a number of user authentication factors at launch and/or for transactions up to a risk threshold, such as a certain transaction value. In such an example, however, the application 231 in the mobile device 11 would have one or more additional rule sets, e.g. for application to ranges of higher value transactions. A higher value rule set would cause the application to prompt the user and collect one or more additional user authentication factors. The rule sets at the transaction security processing server 29 may be somewhat complementary. For example, rule sets for the highest value transactions may cause the mobile device to collect and transaction security processing server 29 to look for more factors and/or factors that are more difficult to spoof in the high value transaction requests and then require verification thereof with respect to corresponding reference factors in the server's database. Lower value transactions, however, may call for receipt of fewer and less secure authentication factors from the device (e.g. those obtained in accordance with the minimum rule set implemented at the mobile device 11); and for some transactions, the server rule set may not require verification of all of the received factors or may require only partial verification of some factors (e.g. verify that a requested image is of a human face but not that the image is a picture of the actual account-related user/customer).

The mobile device users may conduct purchase activities that result in payment transactions, leading to the authentication procedures under consideration with many different types of merchants and their systems. Several examples are shown in the drawing for discussion purposes.

A retail merchant may operate a store, bank branch office, restaurant or similar brick-and-mortar type of business at a premises 40. Although different types of businesses use different equipment for payment processing, the premises 40 has a POS terminal system 41. Larger enterprises will have multiple POS terminals at a particular premises and may have any number of similar premises 40. The POS terminal system 41 typically receives information to determine an amount of payment required for a purchase and interacts with the customer in some manner to obtain and account for the payment for the particular purchase. In the context of a bank, either as an automated teller machine function or via a teller's terminal device, the payment transaction may be a transfer of funds from one account to another, even within the one bank.

The merchant may also operate a backend system of one or more computers, generally represented by the host computer 43, for its accounting data processing purposes. The merchant system 43 communicates with the POS terminal 43, for example, to note items/services purchased (e.g. for inventory management purposes) and amounts charged or received in payment for accounting purposes. Although shown at one premises or facility 40 for convenience, the computer system 43 may be at another location separate from the store, bank branch, restaurant or the like having the POS terminal 41. Both the POS terminal 41 and the merchant's backend computer system 43 may communicate via a secure private network or a virtual private network through the Internet 30, e.g. so that the POS terminal 41 can implement credit, debit or other payment transaction processing, and so that the accounting application in the backend system 43 can track payments to the enterprise via financial institutions.

Other merchants may have some number of more generic types of terminal devices (at one or more locations) for enterprise personnel, as represented generally by the terminal 33. Such equipment, for example, may be used at a call center, for catalog sales or other customer service. As another example, rather than a POS terminal, an automobile dealer or the like may have its personnel do all of the requisite data processing involved in vehicle purchases via network connected computer terminal devices similar to terminal 33. Backend data processing systems for inventory management and accounting or the like, for such a merchant, are omitted for convenience. The terminals or other equipment of such a merchant, however, have data communication capabilities. In the example, the terminal 33 therefore is connected for data communication via the Internet 30.

The present secure payment transaction processing, including user authentication, may also support user purchases from on-line merchants. Hence, as another merchant example, the drawing shows an on-line eCommerce website server 31. Only one such server 31 is shown for convenience.

To complete the general discussion of the elements shown by way of example in the first drawing, FIG. 1 also shows a WiFi access point 51 and a user's computer terminal 53. Some mobile devices 11 do not have capability of (or are not activated for) communication via the public mobile wireless communication network 20 but may have the capability to communicate via other media such as WiFi. Even many of the mobile devices such as 11a, 11b that are capable of public network communication also support WiFi communication, e.g. for lower cost data communications when WiFi is available. In the example, the WiFi access point 51, such as an access point at a home office or a facility that provides WiFi hotspot service for its customers connects to the Internet 30, to allow data communications via the Internet with any other equipment having Internet connectivity. WiFi connectivity in the home, for example, may enable a customer to use a mobile device 11 to conduct a search and an on-line purchase transaction with an eCommerce merchant, via communication with a server such as the server 31.

In example, the tablet type device 11b at times communicate via a base station (BS) 22 and the mobile network 20 and at other times communicates via the WiFi access point 51 and the Internet 30. Although not shown for convenience, smartphone type mobile devices such as 11b typically will use both types of communications.

The communications of the devices 11 through the various networks may involve various purchase transactions and a wide range of other on-line activities; but note for this discussion, such communications also support user authentication for secure payment transactions, including at least some communications with the transaction security processing server 29. For security purposes, however, the financial institution server(s) will likely be configured or connected to the network(s) in such a manner as limit or block direct access by customer or other general user terminal devices such as the mobile devices 11 or the user terminal devices 53.

In the secure payment transaction processing model here, the actual financial payment processing is handled by a financial transaction entity, without sharing account identifiers or other system information about the customer's financial account on which payment is based, with the merchant's system or the customer's mobile device. Although the financial transaction entity may be another enterprise, such as the government or the carrier that operates the mobile network 20, in our example, the financial transaction entity is a financial institution such as a bank or credit/debit company with which the customer maintains a suitable financial account for making purchases. Some number of such institutions, operating one or more servers 32, may obtain user authentication service in relation to payment transactions from the entity providing authentication service via the server 29, in the example, from the carrier that provides services of the network 20 to the users of mobile devices such as 11a and 11b.

For payment processing, the financial institution operates a server 32 connected for data communication via the Internet 30. Associated security systems are omitted for convenience. Although shown as a single hardware platform, for convenience, the functionality of financial institution server 32 may be implemented on some larger number of network connected computers, e.g. to provide redundancy and/or to handle a particular expected peak volume of payment transactions on behalf of the institutions customers.

For secure payment processing, the customer therefore enrolls for the service with the financial institution and provides their personal and financial information. The financial institution, upon approval authorizes the customer to use a Secure Payment application (app), which is installed on their mobile device(s) 11a or 11b that are to be used in payment transactions. Identification and account related information, for use by the financial institution server 32 is stored on a database in the server computer or on another secure data storage system accessible to the central processing unit (CPU) of that server computer 32.

The information collected as part of the enrollment process typically includes reference copies of at least some of the various user authentication factors from the customer, for use in later authentication procedures. Additional reference factors or updated copies of reference factors may be collected at later times, upon validation of the enrolled customer. Although not necessarily collected from the particular user, reference factors may also include general templates for some of the factors, e.g. general criteria to confirm that an image contains a human face or that a scan is of a human fingerprint. The financial institution establishes a number of rule sets for different levels of secure authentication to apply under a variety of different circumstances. The different rule sets call for input and validation of different factors from the customer when using the mobile device 11 for a secure payment transaction. Hence, the enrollment operations entail collection of reference copies from user input via the mobile device 11 that they intend to use, for use by authentication processing in accordance with all of the rule sets that the institution expects may apply to the particular customer's payment transactions.

As noted, the financial institution, upon approval of the newly enrolled customer, authorizes the customer to use the "Secure Payment" application on a mobile device 11. This may entail downloading or otherwise activating the application on the customer's mobile device 11 in a manner to provision the device itself for the secure payment transaction service. This also may entail activating the user's account in the financial institution's server 32.

Activation also involves providing data for use by the transaction security processing server 29 during user authentications by that server 29. For each valid customer enrolled for the relevant transaction services, the transaction security processing server 29 will store or have access to secure storage of an authentication file containing device identification information for the customer and/or their mobile device 11 and the reference factors for the valid customer obtained during enrollment. As part of an authentication procedure, the transaction security processing server 29 identifies an authentication file based on the received identification. The identified authentication file corresponds to the customer and thus generally corresponds to any financial account the customer has that is maintained by one or more of the financial transaction entities. Although a financial transaction entity may be another enterprise, such as the government or the carrier that operates the mobile network 20, in our example, the financial transaction entity is a financial institution such as a bank or credit/debit company with which the customer maintains a suitable financial account for making purchases. The identified authentication file may point to the financial entity and/or the applicable server 32. The identified authentication file, however, does not specifically identify any particular financial account of the customer maintained by any financial transaction entity.

Although the financial institution may keep copies for its own purposes, for actual authentication processing, the financial institution provides copies of the reference factors to the enterprise (carrier in our example) operating the transaction security processor server 29. To allow correlation during processing, the financial institution also forwards information identifying the customer and/or their mobile device as well as identification of the particular financial institution and/or the particular server 32 that is to handle payment transactions for the newly enrolled (or updated) customer's account. The relevant information, including the reference factors, customer/device and institution/server information, are stored on a database in the computer of server 29 or on another secure data storage system accessible to the CPU of that server computer 29.

Once enrolled and activated as outlined above, the customer can use the Secure Payment application to complete a transaction with a merchant, such as at a retail location 40 (e.g. store, restaurant, financial institution, etc.), with a call center or other merchant using terminals like 33 to complete payment, or with on-line websites such as the website offered by the server 31 for eCommerce.

When the customer wants to pay for a purchase, the customer identity is verified using a combination of features on the customer's mobile device. Rather than identify the financial account, authentication uses an identification of the mobile device. The current user of the mobile device is authenticated based on input of a number of authentication factors, for comparison to corresponding reference factors. The required factors for authentication can vary based on rules set by the financial institution, and the rule set (from among the sets defined by the institution) that apply to user authentication for a particular transaction are selected based on one or more transaction parameters, such as the value of the transaction, location, merchant, time, product(s) or service(s) involved, device transactional history, other recent device usage history, etc. and/or combinations of such parameters. Thus, in at least some of the embodiments, the mobile device information alone provides information for identifying the financial account—the financial account information is never transmitted from the mobile device during the purchase.

Examples of the user authentication factors that the authentication may call for and consider include: fingerprint (determined by sensor on the mobile device), facial recognition (facial image extracted from still or video images taken by the device); passcode (PIN or password entered by touch or speech on the mobile device); speech recognition (voice print entered by speaking to device); gesture (entered by touch on mobile device or by moving the mobile device). Rather than correlating these factors directly with the user/customer's account, however, the authentication processing is based on other identification of the mobile device, such as the ESN, the mobile equipment identifier (MEID), a media access control (MAC) layer address, etc. Although less secure, because unique association with a particular physical device is less certain, the authentication procedures may alternatively use assigned device identifications such as MDN, mobile identification number (MIN), or International mobile Subscriber Identity (IMSI). Depending on the level of security desired by the involved enterprises, some procedures may utilize a combination of a unique device identifier and an assigned device identifier (e.g. an ESN and the MDN).

As noted, rule sets for use authentication can be selected based on a variety of transaction related parameters. Some parameters, such as transaction amount and a merchant identification can be entered by the user or by an interaction of the device with the merchant's equipment (e.g. POS terminal 41) and set to the transaction security processor server 29 as part of the initial request for use authentication for the financial transaction. The physical location of the mobile device 11 may be determined by methods such GPS data, identification of the closest cell tower, relay of a code transmitted via a Bluetooth beacon or WiFi access point, for example, as determined and sent from the device during communications for the user authentication procedure. The mobile device may also obtain location information via a near field communication (NFC) with a POS terminal or other device, at a merchant location or the like, for use as a transaction parameter during the user authentication in the secure transaction processing.

In the example, a successful user authentication causes the transaction security processing server 29 to notify the financial institution server 32 of the transaction request and the successful user authentication. The notification, for example, may include identification of the device and/or the validated user (user identified from the records of the server 28 and/or 29) and the particular authentication in factors that have been validated. The financial institution server 32 confirms that the authentication procedure followed the applicable rule set. Then, based on the institution's own internal transaction rules, the server 32 determines whether or not to make the requested payment, e.g. if the user has sufficient credit or deposited funds available under their account with the financial institution.

Over time, the system may also build up a detailed history of transaction types, amounts, times and locations. The history may also include other device activities that may be unrelated to financial transactions. This history can be analyzed for marketing purposes, or to vary the rule sets for authentication and thus the factors and/or analysis of factors for transactions and/or usage of the device that fit or differ from expected patterns. The historical data may include transaction data, e.g. records of transactions involving successful user authentication, and data regarding device usage for non-transaction-related operations of the mobile device 11.

History for the mobile device 11 may include historical data related to transaction activities, e.g. amounts, merchants, locations, numbers of failed and successful authentications or transactions, etc. The history for the mobile device 11 may include historical data other activities not specifically related to transactions, e.g. region(s) of most frequent use of the mobile device 11 through the communication network 20 and/or common and recent types of communications through the network 20. A recent departure from such common historical practice may be questionable and lead the transaction security processing server 29 to apply a rule set calling for a stricter authentication procedure, e.g. requiring more factors, requiring more precise matching to one or more reference factors and/or validation of factors that are typically more difficult to spoof. Much like the processing for credit or debit cards, a financial institution may allow for special circumstances and alter the rules accordingly, for example, to not impose the stricter authentication procedure based on an unusual location if the location corresponds to a travel destination, e.g. as might be identified by the customer during a call-in to personnel of the financial institution prior to or during the travel.

For purposes of history tracking, the Secure Payment application 231 therefore may collect data regarding operations of the mobile device and provide historical data to the server 29, to supplement data from the transactions and/or from the network. For example, the secure transaction application may collect data such as frequency and/or length of use of other applications on the device 11 and provide such data to the server 29 with transaction request or at other specified times. A recent change in the tracked application usage may be another indicator of a different user that might cause the application 231 and/or the server 29 to apply a stricter rule set to a particular payment transaction.

The processing outlined above and discussed by way of more detailed examples later offers the involved entities multiple degrees of freedom to select authentication factors to include in the user authentication rule sets. Just by way of example, the technology allows rule sets to include factors for verification such as password, touch gesture, device motion gesture, voice print, single fingerprint, scans of prints from multiple fingers, single facial image, combination of multiple facial images (e.g. from different selected perspectives), etc. Some of these factors are more secure than others, whereas others are easier for hackers or the like to steal, copy or otherwise spoof. Selecting and combining such factors in a given transaction processing operation increases security, but the degrees of freedom offered by the present examples also allows rule sets to call for different factors and levels of verification for different transactional circumstances.

When a transaction is rejected, the collected user authentication factors may be saved by the transaction security processing server 29, for other future uses. For example, if law enforcement determines that the device has been stolen or used in some fraudulent manner, any biometric factor inputs such as a facial image and/or a scan of a fingerprint may be provided to an appropriate law enforcement agency along with device identification and location data.

Before discussing details of operations, it may be helpful describe examples of the elements of some of the devices/equipment used in our example of system 10 in FIG. 1.

Figure 2:
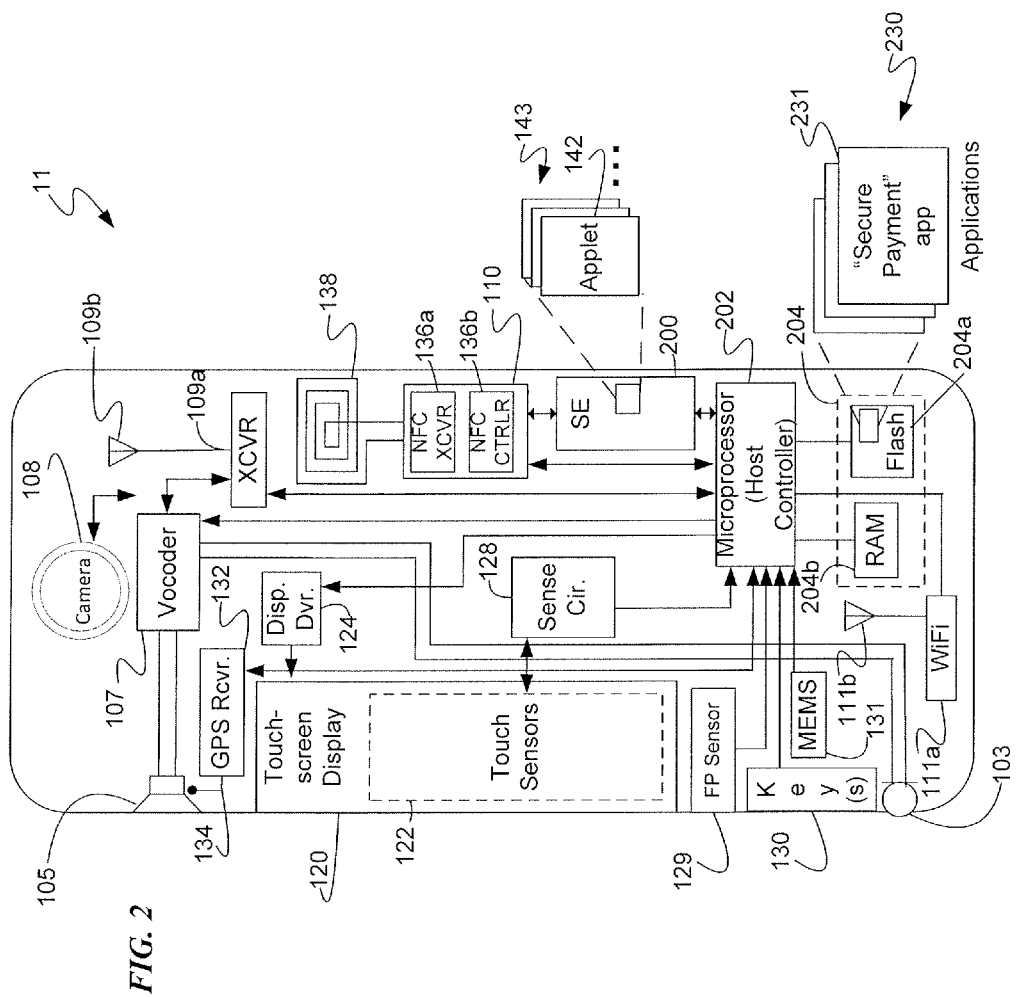
FIG. 2 is a high-level functional block diagram of an example a mobile device that may communicate via the system of FIG. 1, including operations in a secure payment procedure.

It should be appreciated that the disclosed subject matter may be implemented using essentially any mobile computing apparatus having appropriate user inputs/outputs, a processor and communication capabilities. For discussion purposes, FIG. 2 illustrates elements of a touch screen type of mobile device 11, although other non-touch type mobile devices may be used in the authentication and payment operations under consideration here.

Examples of touch screen type mobile devices that may be used to implement mobile device 11 may include (but are not limited to) a smart phone, a personal digital assistant (PDA), a tablet computer or other portable device with biometric sensing capability. However, the structure and operation of the touch screen type mobile device 11 is provided by way of example; and the subject technology as described herein is not intended to be limited thereto. For purposes of this discussion, FIG. 2 therefore provides a block diagram illustration of the example of the mobile device 11 having a touch screen display for displaying content and receiving user input as (or as part of) the user interface.

Although the transactions that are the focus of discussions here utilize data communications, a typical mobile device such as the mobile device 11, also supports voice communications. Hence, in the example shown in FIG. 2, the mobile device 11 includes a microphone 103 for audio signal input and a speaker 105 for audio signal output. The microphone 103 and speaker 105 are communicatively coupled to a voice or audio encoder/decoder (vocoder) 107. For a voice telephone call, for example, the vocoder 107 provides two-way conversion between analog audio signals representing speech or other audio and digital samples at a compressed bit rate compatible with the digital protocol of wireless telephone network communications or voice over packet (e.g., Internet Protocol) communications.

The vocoder, speaker and microphone may also be used as elements of the user interface during other operations of the device, including some types of transaction communications. For example, audible prompts may be output via the speaker. Also, if one of the user authentication factors called for by an applicable rule set involves a speech input, e.g. for voice print verification, the mobile device would receive the user's speech input via the microphone 103, and the vocoder 107 would digitize that speech input for further processing.

Also, as shown in FIG. 2, the mobile device 11 includes at least one digital transceiver (XCVR) 109a, for digital wireless communications via a wide area wireless mobile communication network, although the mobile device 11 may include additional digital or analog transceivers (not shown). The transceiver 109a conforms to one or more of the various digital wireless communication standards utilized by modern mobile networks. Examples of such transceivers include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, transceiver 109a provides two-way wireless communication of information including digitized audio signals, still image and/or video signals, web page information for display as well as web related inputs, and various types of mobile message communications to/from the mobile device 11.

Several of these types of communications through the transceiver 109a and a network, as discussed later, relate to the user authentication in support of a secure payment transaction. Communication of a user authentication for a payment, for example, may utilize IP packet data transport utilizing the digital wireless transceiver (XCVR) 109a and over the air communications to and from a base station 22, the traffic portion of network 20, the Intranet 21 to and from the transaction security processing server 29.

In one example, the transceiver 109a also sends and receives a variety of signaling messages in support of various voice and data services provided by a network of a wireless service provider, to a user of mobile device 11 via the mobile communication network. Transceiver 109a connects through radio frequency (RF) send-and-receive amplifiers (not shown) to an antenna 109b. Transceiver 109a may also support various types of mobile messaging services, such as short message service (SMS), enhanced messaging service (EMS), and/or multimedia messaging service (MMS). Although transaction communications involving data for user authentication of a payment transaction typically utilize IP data transport, such transaction communications may at times utilize one or more of these mobile messaging services for the data transport of some or all of the relevant data through the mobile communication network 20.

Many modern mobile devices 11 also support wireless local area network communications over WiFi, instead of or in addition to data communications using the wide area mobile communication network. Hence, in the example of FIG. 2, for packet data communications, the exemplary mobile device 11 may also include a WiFi transceiver 111a and associated antenna 111b. Although WiFi is used here as the example, the transceiver 111a may take the form of any available two-way wireless local area network (WLAN) transceiver of a type that is compatible with one or more standard protocols of communication implemented in wireless local area networks, such as one of the WiFi standards under IEEE 802.11 and/or WiMAX.

The transceiver 111a, for example, may provide two-way data transport for wireless communication with a wireless access point in a residence or enterprise that the user frequents or with any available hotspot offered in a public venue. A WiFi access point, such as that shown at 51 in FIG. 1, communicates with compatible user equipment, such as the mobile device 11, over the air using the applicable WiFi protocol. The WiFi access point provides network connectivity, usually to the public Internet 30. In a home or office premises, for example, the WiFi access point would connect directly or via a local area network (LAN) to a line providing interne access service. In a more public venue, an access point configured as a hotspot may offer similar connectivity for customers or others using the venue, on terms and conditions set by the venue operator. Although communicating through a different network or networks, the transceiver 111a supports various types of data communications similar to the packet data communications supported via the mobile network transceiver 109a, including communications related to user authentication to and from the transaction security processing server 29.

The mobile device 11 further includes a microprocessor, sometimes referred to herein as the host controller 202. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The processor 202, for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU or processor hardware in server computers (e.g. FIG. 3), user terminal computer equipment (e.g. FIG. 4), point of sale equipment (e.g. FIG. 5), network elements etc.

Returning more specifically to the mobile device example of FIG. 2, the microprocessor 202 serves as a programmable host controller for mobile device 11 by configuring mobile device 11 to perform various operations, for example, in accordance with instructions or programming executable by processor 202. For example, such operations may include various general operations of the mobile device 11 as well as operations related to user authentication for payment transactions and possibly various purchase transactions with merchants' equipment. Although a processor may be configured by use of hardwired logic, typical processors in mobile devices are general processing circuits configured by execution of programming.

The mobile device 11 includes a memory or storage system 204, for storing data and programming. In the example, the memory system 204 may include a flash memory 204a and a random access memory (RAM) 204b. The RAM 204b serves as short term storage for instructions and data being handled by the processor 202, e.g. as a working data processing memory. The flash memory 204a typically provides longer term storage.

Hence, in the example of device 11, the flash memory 204a is used to store programming or instructions for execution by the processor 202. Depending on the type of device, the mobile device 11 stores and runs an operating system through which specific applications may be run on the device. Examples of operating systems include Android, Apple iOS (I-Phone or iPad devices), Windows Mobile, RIM BlackBerry operating system, or the like. Flash memory 204a may also be used to store mobile configuration settings for different mobile applications or services executable at mobile device 11 using processor 202.

Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules.

The instructions or programming may be used to implement the user authentication and any other device functions associated with secure payment transactions. Program aspects of the technology may be thought of as "products" or "articles of manufacture" typically in the form of executable code or process instructions and/or associated data that is stored on or embodied in a type of machine or processor readable medium, such as one of the memories 204a, 204b of memory system 204, or a memory of a computer used to download or otherwise install such programming into the mobile device, or a transportable storage device or a communications medium for carrying program for installation in the mobile device 11.

In the example, the flash memory 204a stores a number of applications 230 for execution by the microprocessor-based host controller 202, typically through operation/execution of the device operating system. Of note for purposes of the present discussion, the flash memory 204 stores a Secure Payment application (app) 231 as one of the programs 230 for execution by the microprocessor 202. For example, the Secure Payment application 231 may be installed as part of or after the customer has enrolled for the mobile secure payment transaction service. Alternatively, the Secure Payment application 231 may be pre-installed on the mobile device 11 at manufacture or activation on the network but then configured or provisioned in an appropriate manner for use when the customer completes the enrollment for the mobile secure payment transaction service.

In the example, execution of the Secure Payment application 231 by the microprocessor 202 configures the mobile device 11 to perform a variety of functions, particularly functions related to the user authentication for secure payment transactions. The Secure Payment application 231 causes the mobile device to collect the factors needed to comply with the rule sets for the various transactions. In one implementation, the rule sets reside in the server 29, and the Secure Payment application 231 is instructed by the server 29 as to the factors to collect for each transaction. In another implementation, the Secure Payment application 231 includes or has access to rule sets stored in memory 204a to determine the factors to collect for each transaction. Details of examples of such user authentication functions are discussed, more, later.

The Secure Payment application 231 may be an application developed and distributed to mobile devices 11 by the entity operating the transaction security processing server 29, e.g. the mobile network carrier in our example; or application 231 may be an application developed and distributed to mobile devices 11 by the financial institution or their partner, e.g. a credit or debit card company. Depending on the arrangements between the entities, the application on the mobile device 11 may be branded to indicate the identity of one or more of those involved enterprises to the device user. The Secure Payment application 231 may be a standalone application as shown, for example, as would be individual selected by the user for launch as outlined above. The Secure Payment application 231, however, may have an application program interface (API) which allows other applications to call and launch the Secure Payment application 231 for payment processing, e.g. when the user of device 11 elects to make a payment for an in-app purchase in another of applications 230.

Although the functions for secure payment processing in the device 11 are configured by use of a software 'application,' in our example, it should be apparent that the software to configure the device to perform the functions under consideration here may be implemented and deployed in other ways. For example, the programming to configure the processor 202 and thus the mobile device 11 for the secure transaction processing may be integrated into the device operating system or otherwise part of the native device programming and pre-installed with the operating system or downloaded as part of an operating system or native programming upgrade.

The user launches the transaction application (app) 231, for example, by selecting the Secure Payment application 231 by touching an icon for that application 231 displayed on the touchscreen display of the mobile device 11. Start-up of the Secure Payment application 231 may involve a prompt, input and verification of a received security factor such as a password, a spoken audible input (or voice print) or a fingerprint scan. If required by the Secure Payment application 231 launch procedure, the input factor may be temporarily saved for later use by the Secure Payment application 231 during its processing of the transaction. If the particular factor is not required at launch or is different from factors used in the actual processing for the particular transactions, one or more of these factors may be obtained from the user later in the procedure, as will be discussed more below.

Before discussing details of the authentication procedures/functions, we will discuss other elements of the example of the mobile device 11, to complete the description of the drawing figure.

In the illustrated example, the mobile device 11 includes a secure component 200. The secure component 200 (e.g. a secure element or "SE") may be provisioned as a section within the memory 204 or may take the form of a universal integrated circuit card (UICC) located within the mobile device 11. A common example of a UICC implementation of the SE 200 is a subscriber identity module (SIM). Of note for purposes of our discussion of user authentication for secure payment transactions, the SE provides secure storage for various identifier associated with the mobile device 11. The SE typically has a unique identifier and is provisioned for operation of the device 11 in the network 20 by storage of a MDN and/or MIN assigned to the device 11 by the network operator.

The secure component contains applications that use secure keys running inside the secure processor. Although similar to other applications, the applications for the secure processor are sometimes smaller and sometimes referred to as applets 143. For example, there may be at least one applet 142 for processing of a payment transaction and encrypting payment information received for transaction processing of the type described herein. If the user authentication procedure involves unique operations by the SE 200, for example, to encrypt some of the identification, transaction parameter or factor data, then the applets 143 may include a specific applet for the secure transaction processing.

The mobile device 11 also includes an image input device. Although available for other uses, the imager 108 is another of the elements of the device 11 that may be used for biometric inputs, including input of user authentication factors, for secure payment transactions. Hence, the processor 202 is coupled to at least one imager 108, which in a typical example is a digital camera. Although the drawing shows a single imager/camera 108, for convenience, it should be appreciated that the mobile device 11 may have two or more cameras. Many such devices 11 today include front and rear facing cameras. Also, a mobile device 11 may have multiple cameras on the front and/or rear side, for example, to support three-dimensional (3D) imaging applications.

A mobile device 11 supporting secure payment transactions of the type under consideration here may include a variety of different types of physical user interface elements. For discussion purposes, in the mobile device 11 shown in FIG. 2, the physical user interface elements of mobile device 11 include a touch screen display 120 (also referred to herein as "touch screen 120" or "display 120"). For output purposes, the touch screen 120 includes a display screen, such as a liquid crystal display (LCD) or the like. The display may be used for part of the user interaction during user authentication procedures, e.g. to display icons or other information to prompt the user to input one or more of the user authentication factors called for by an applicable authentication rule set. For input purposes, touch screen display 120 includes a plurality of touch sensors 122. Touch sensors 122 may be used as a biometric sensor that captures a biometric factor, e.g., a touch gesture. Some touch screens incorporate a fingerprint sensor that may be used as another biometric authentication factor input.

Other user interface or biometric input elements may include the imager/camera 108 and a keypad including one or more keys 130. As noted earlier, the camera/imager 108, for example, may be used as a biometric sensor that captures a biometric factor, e.g., an image of the user's face or a retina.

The keypad may be implemented in hardware as a physical keyboard of mobile device 11, and keys may correspond to hardware keys of such a keyboard. Alternatively, some or all of the keys 130 (and keyboard) of mobile device 11 may be implemented as "soft keys" of a virtual keyboard graphically represented in an appropriate arrangement via touch screen display 120. The soft keys presented on the touch screen display 120 may allow the user of mobile device 11 to invoke the same user interface functions as with the physical hardware keys. Some rule sets for user authentication during secure payment transactions may utilize the physical or virtual keyboard for user input of a passcode, e.g. a personal identification number (PIN) or password, for server comparison to a reference passcode value provided earlier by the valid user customer.

In some implementations, the microphone 103 and speaker 105 may be used as additional user interface elements, for audio input and output, including with respect to some functions related to the transaction processing and communication, as described herein. As noted, another input for an authentication factor would be a speech input via the microphone 103, either for voice print recognition of the user of for speech input of a passcode.

In general, touch screen display 120 and touch sensors 122 (and one or more keys 130, if included) are used to provide a textual and graphical user interface for the mobile device 11. In an example, touch screen display 120 provides viewable content to the user at mobile device 11. Touch screen display 120 also enables the user to interact directly with the viewable content provided in the content display area, typically by touching the surface of the screen with a finger or an implement such as a stylus. For example, when an icon of a face is displayed by the Secure Payment application 231, to prompt user input of a facial image, the user can touch the face icon to activate the camera 108 for the appropriate input of the currently required facial image type user authentication factor.

In some implementations, touch screen display 120 is a capacitive touch screen display, and touch sensors 122 are independent capacitors arranged as a grid and disposed at various points throughout a transparent conductive material (e.g., indium tin oxide) that is layered onto a hard surface composed of insulating material (e.g., glass). As another example, the respective locations of touch sensors 122 (e.g., capacitors) may correspond to different intersection points of a matrix of rows and columns of the layered conductive material. Alternatively, touch sensors 122 may include a grid of capacitive electrodes formed of one or more layers of transparent conductive material etched onto a sheet of hard insulating material, as described above. However, it should be noted that touch screen display 120 is not limited to either of the above-described implementations. Accordingly, touch screen display 120 may be implemented using any of various conventional or other techniques based on, for example, the type of touch screen technology desired for a particular implementation of a mobile device.

User input via the touch screen display 120 includes touch of the display device with the user's finger, stylus or similar type of peripheral device used for user input with a touch screen. At least in some capacitive screen examples, when current is applied to touch screen display 120, user input can be detected by touch sensors 122 based on a measurable change (e.g., reduction) in mutual capacitance based on measurable changes in capacitance and voltage at one or more individual sensor locations corresponding to the physical point(s) of contact of the user's finger(s) or conductive stylus with respect to touch screen display 120.

As shown in FIG. 2, the mobile device 11 also includes a sense circuit 128 coupled to touch sensors 122 for detecting the occurrence and relative location/position of each touch with respect to a content display area of touch screen display 120. In this example, sense circuit 128 is configured to provide processor 202 with touch-position information based on user input received via touch sensors 122. In some implementations, processor 202 is configured to correlate the touch position information to specific content being displayed within the content display area on touch screen display 120. The touch-position information captured by the sense circuit 128 and provided to processor 202 may include, but is not limited to, coordinates identifying the location of each detected touch with respect to the display area of touch screen display 120 and a timestamp corresponding to each detected touch position.

The information provided by the sense circuit 128 may include, for example, a series of different locations of touch points/positions detected across the content display area of touch screen display 120 over a predetermined period of time. The location and time information for a series of continuous touch points/positions can be used by processor 202 to track the movement of the user's finger(s) (or other input device) across the touch screen display 120. This information also may be used to track various parameters including, but not limited to, the direction and speed of finger movement based on changes between the different touch positions over time. The information tracked by the sense circuit 128 is used by processor 202 to detect various points of touching as well as different types of touch gestures, for enabling the processor and thus the device 11 to perform operations in accordance with each touch or touch gesture. For example, the device 11 may utilize such touch sensing and processing technology to detect a touch gestural input as another type of biometric input for a factor for user authentication.

Another type of gestural detection that may be used as an input for a factor for user authentication is detection of movement of the device 11 itself. Hence, the illustrated example of a mobile device 11 also includes one or more motion sensors, such an accelerometer and/or a gyroscope and associated circuitry for signaling microprocessor 202 in response to detected motion input, which are implemented in the example by a Micro-Electro-Mechanical System (MEMS) 131.

The detected motion input may include, for example, a change in orientation of the physical device within three-dimensional space, as well as a determined rate of change in position of the device, in this way, mobile device 11 can use motion sensing by sensors of the MEMS 131 to monitor and track the detected motion or physical movement of the device 11. The tracked motion detected by MEMS sensing can be used by microprocessor 202 to determine whether the rate of such movement corresponds to a pattern of movement associated with the predetermined physical gesture. The Secure Payment application 231 in turn can cause the device 11 to issue a prompt and subsequently obtain motion detection from the MEMS 131 as an indication of gestural movement of the device 11 by the current user, for use as a user authentication factor in the secure payment transaction processing.

Another type of input element usable for authentication factor input is the fingerprint (FP) sensor 129. Although a camera such as 108 might be used for fingerprint sensing, a number of models of mobile devices today come equipped with a separate scanner or sensor for detecting a fingerprint as a user moves their finger across the sensor 129. As noted, a fingerprint sensor may also be implemented as an element of or in combination with the touch sensors of the touch screen display.

The user interface capabilities of the mobile device 11 provide output to and receive input from the user of the mobile device 11, for any of the various functions, operations or applications of the device. For example, the Secure Payment application programming 231 configures the mobile device 11 to prompt for and obtain various user inputs for the secure payment transaction. These inputs include transaction related information as well as user authentication factors. The user will input authentication factors via the appropriate hardware elements at appropriate points in a transaction. The transaction information, such as purchase amount and possibly a merchant or product identification, may also be input via the user operating an input element such as the touch screen. In some cases, the relevant transaction information may be input other ways, for example, via communications with equipment or systems of the merchant. For on-line purchases, for example, such communications with a website server use the applicable data network transceiver 109*a* or 111*a*. In establishments having advanced POS terminal equipment, the merchant's POS terminal 41 may be able to communicate with the mobile device 11, for example, via a short range wireless technique.

As an example supporting short range wireless communication for POS or other purposes, the illustrated mobile device 11 has NFC capability. NFC is a set of standards for smart phones and similar devices, such as the exemplary mobile device 11 discussed here, to establish radio communication with other such devices as well as with compatible NFC readers by coming to close proximity (e.g., 4-10 cm or less). Due to its short range and support for encryption, NFC communication is suitable for secure communication over short distances. Each NFC enabled mobile device includes a transceiver configured to communicate with other NFC capable equipment.

The illustrated mobile device 11 further includes an NFC sensor. The NFC sensor may be implemented in a variety of ways. In the exemplary mobile device 11 of FIG. 2, the NFC sensor includes an NFC type radio frequency transceiver 136a, which is formed by an NFC chipset 110. The NFC chipset 110 provides two-way wireless communication of information in accordance with NFC technology and protocols. The NFC chipset 110 includes an NFC controller 136b. For simplicity, the NFC 110 is sometimes referred to herein as the NFC controller or module 110, while it will be understood that it is a controller within the NFC chipset 136. The exemplary NFC sensor also includes an antenna, such as coil antenna 138. The NFC chipset 110 of mobile device 11 connects to the NFC coil antenna 138, for transmitting and receiving NFC communications to/from other NFC compatible devices with compatible transceivers over short air link distances. The transceiver 136a formed by the NFC chipset 110 also sends and receives a variety of signaling messages for establishing NFC links with other NFC-enabled devices and sends and receives various user data over the established NFC links. The signaling, for example, may allow the transceiver formed by the NFC chipset 110 to detect proximity of another NFC capable device, establish an NFC link with the other device, trigger execution of an appropriate application within the mobile device 11 and send and/or receive data for the application as between the mobile device 11 and the other NFC capable device. Some modern mobile devices are already equipped with such NFC equipment, and increased NFC deployment is expected in the future.

As outlined earlier, the rule set selection for user authentication in support of secure transaction processing may be based in part on device location. Many implementations of mobile devices today support location based services. Location information may be used in a variety of services/applications. There are a variety of ways that a mobile device 11 may be configured to obtain information as to current location of the device. In one example, the mobile device 11 includes a global positioning satellite (GPS) receiver 132 and associated antenna 134. GPS is a space-based satellite navigation system that provides location and time information anywhere on Earth, where there is an unobstructed line of sight to at least three of the GPS satellites. The mobile network may provide information to assist in a GPS based location determination. Also, the mobile device may be configured to determine its location in other ways, for example, when GPS determination is unavailable (e.g. when signals are blocked by building structures or the like). The Secure Payment application 231 will configure the mobile device 11 to determine its location when the Secure Payment application 231 is processing a payment related authentication and provide the best location information currently available to the device in a transmission to the transaction security processing server 29.

The structure and operation of the mobile device 11, as outlined above, were described by way of example only.

FIGS. 3 and 4 provide functional block diagram illustrations of general purpose computer hardware platforms. FIG. 3 illustrates a network or host computer platform, as may typically be used to implement a server, such as the server 29 or the server 32 of the system 10 of FIG. 1. FIG. 4 depicts a computer with user interface elements, as may be used to implement a personal computer or other type of work station or terminal device, such as the merchant's terminal 33 or the user computer terminal 53, although the computer of FIG. 4 may also act as a server if appropriately programmed. It is believed that the general structure and general operation of such equipment as shown in FIGS. 3 and 4 should be self-explanatory from the high-level illustrations.

A server, for example, includes a data communication interface for packet data communication. The server also includes CPU, in the form of one or more processors, for executing program instructions. Although the processor(s) forming the CPU may be similar to the microprocessor used in the mobile device of FIG. 2, host or server computer platforms typically use somewhat different circuit architectures, e.g. to provide more processor power. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a personal computer (PC) or tablet computer, similarly includes a data communication interface, a CPU, main memory and one or more mass storage devices for storing user data and the various executable programs (see FIG. 4). A mobile device type user terminal may include similar elements, but will typically use smaller components that also require less power, to facilitate implementation in a portable form factor. Although the processor(s) forming the CPU may be similar to the microprocessor used in the mobile device of FIG. 2, desktop or laptop computer devices typically use somewhat different circuit microprocessor architectures, e.g. to provide more processor power. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also may be conventional in nature.

As outlined earlier, the secure payment processing involves input of transaction related data for use in the user authentication by server 29 as well as implementing the actual financial transaction by the server 32. The transaction related data may be obtained in several different ways, including from different types of merchant equipment, for example, from a merchant terminal 33 or 41. The terminal 33 may be implemented as a mobile device (FIG. 2) or other type of computer terminal device (FIG. 4).

Figure 5:
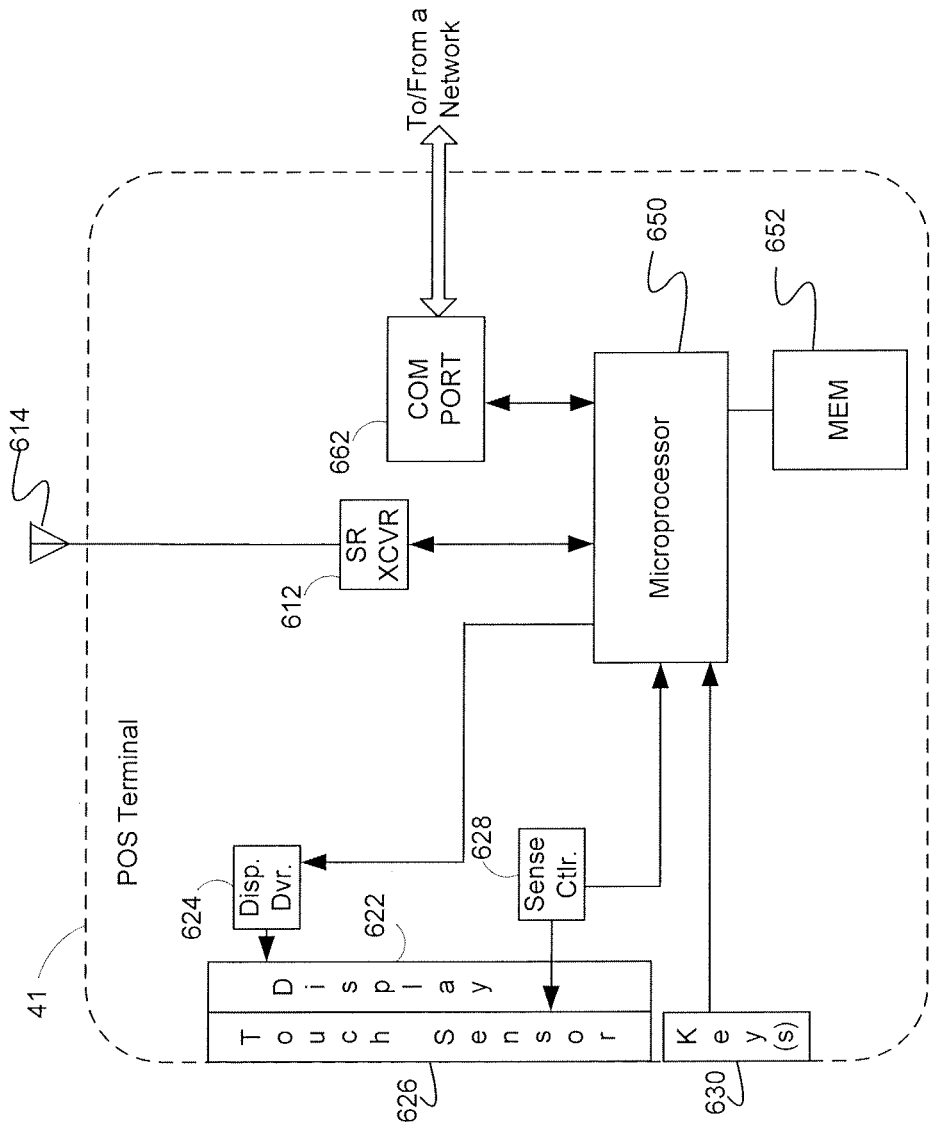
FIG. 5 is a high-level functional block diagram of an example a point of sale (POS) terminal, as may be involved in some secure payment transactions.

FIG. 5, however, is a block diagram of an example of a POS terminal 41. The POS terminal 140 may be implemented as a tablet computer including many of the same elements as the mobile device 11 of FIG. 2, or the POS terminal 41 may be implemented as a stationary terminal device similar to a desktop computer but optimized somewhat for sale activities.

The example terminal 41 shown in FIG. 5 includes a display 622 and touch sensor 626 controlled by display driver 624 and sense control circuit 628 respectively. The terminal 140 may also include keys 630 that provide additional input. Although they may be arranged/sized somewhat differently for optimal use at point of sale, the elements 622 to 628 are generally similar to the display, touch sensor, display driver and sense control circuit discussed above relative to the mobile device example of FIG. 2. Of course other user interface hardware components may be used in place of or instead of the display, touch sensor and keys, depending on the expected types of interactions with merchant personnel and/or customers.

Like the earlier equipment examples, the POS terminal 41 includes one or more processor circuits implementing a CPU functionality for data processing and operational control of the terminal 51. Although a microcontroller or other type of processor circuit may be used, in the example, the CPU processor of the POS terminal 41 takes the form of a microprocessor 650. The structure of the microprocessor 650 may be similar to that of microprocessors discussed earlier.

Programs and data for the microprocessor 650 are stored in a memory 652. Similar to the mobile device 110, the memory 653 may include both random access memory and flash memory, although fixed implementations of the POS terminal 41 are less constrained by the size and power constraints for mobile devices and therefore can use a wider variety of memory types to best suit the expected POS functionalities of the terminal 41.

The example POS terminal 41 also includes a short range transceiver 612 coupled to an antenna 614. The short range transceiver 612 may include one or more of a Bluetooth transceiver, a Bluetooth low-energy (BLE) transceiver, a radio frequency identifier (RFID) transceiver, an ultrasonic transceiver or an infrared transceiver. Furthermore, although it is shown as a transceiver, it may be a receiver instead. In an implementation discussed with respect to user authentication for secure payment transactions, the short range transceiver 612 includes a NFC transceiver. The NFC elements of the terminal 41 may be generally similar to the NFC elements 110, 138 of the mobile device example of FIG. 2.

The POS terminal 41 also includes a data communication interface for packet data communication, shown generally as a com port 662. The com port may use any available data communication technology. In a fixed installation, for example, the com port 662 may be an Ethernet interface card for communication over appropriate data network wiring. For a portable terminal implementation, the com port 662 may be a WiFi transceiver. The com port 662 allows the POS terminal 41 to communicate with other merchant systems, such as the backend data processing system 43.

The keys 630, display driver 624, sense control circuit 268, WiFi transceiver 616, short range transceiver 616 and memory 652 are all coupled to the microprocessor 650. Operation of the terminal is controlled by microprocessor execution of programming from the memory 652. In a given venue 40, all merchant personnel expected to provide services through interactions with users of mobile devices 110 may have fixed or portable/mobile POS terminals 41.

At the brick-and-mortar establishment, the POS terminal 41 can provide the transaction information to the user for inclusion in the request for authentication regarding the payment transaction, in a number of different ways depending on the technology adopted by the merchant at the particular premises 40. For example, the programming for the microprocessor 650 may configure the POS terminal device 40 to display the transaction amount, either for review by the customer or for a cashier or the like to read to the customer. The customer would then manually input the transaction amount for use by the Secure Payment application 231, for example, by virtual or physical key actuation or by speech command input. Another option would be to provide the transaction amount from the POS terminal 41 to the mobile device via short range wireless XCVR 612 and a corresponding transceiver in the mobile device 11. If the XCVR 612 is an NFC system, for example, the user/customer could bring the mobile device 11 within range of the POS terminal 41, and the XCVR 612 and NFC sensor 138 and chipset 110 would handshake and conduct an NFC communication to allow the mobile device 11 to automatically capture the transaction amount for use by the Secure Payment application 231.

In a website on-line purchase scenario, the website server 31 would transmit a page of information about the transaction for display on the mobile device 11 or the customer's computer terminal 53. In a voice call based financial transaction, e.g. for telephone purchase of goods or services, personnel at a terminal such as 33 would review the transaction amount on the terminal and inform the customer, typically via the voice communication although an email or text message could be sent to the mobile for display. In these scenarios, the customer would then manually input the transaction amount for use by the Secure Payment application 231, for example, by virtual or physical key actuation or by speech command input.

It may be helpful at this point to consider a high level procedural flow for user authentication in support of a payment transaction. The user of the mobile device 11 will interact with a merchant of one of the types discussed above to imitate a transaction with the merchant, such as a purchase transaction. At some point in the transaction with the merchant, the customer will want to initiate a financial transaction, e.g. to make a payment to the merchant in order to complete the desired purchase transaction. Discussion of the high level example of the user authentication for the secure payment will reference the flow chart of FIG. 6. Of course, the process steps may be executed in different orders and/or processes in accordance with the present authentication and payment techniques may include additional steps or substeps.

Figure 6:
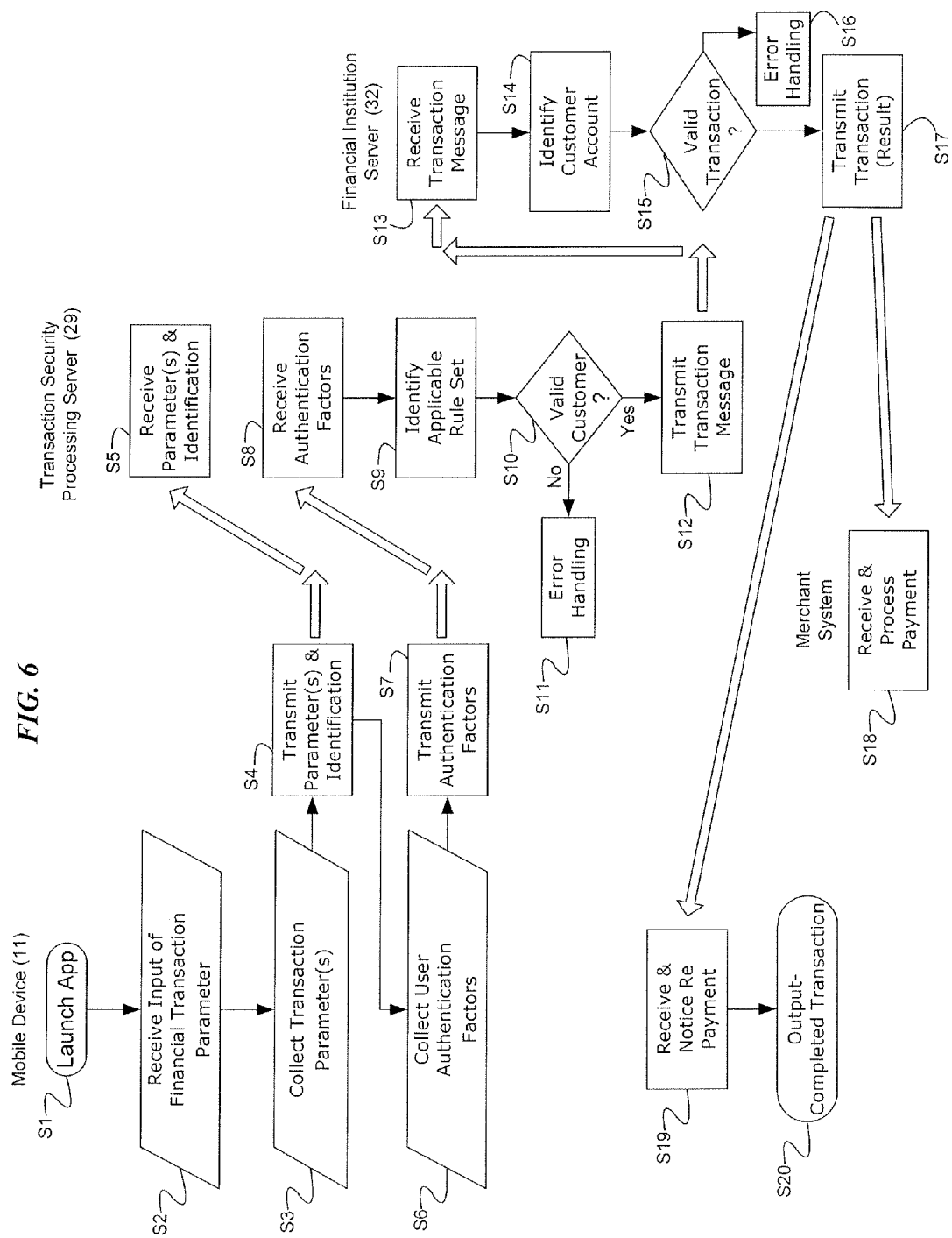
FIG. 6 is a high level flow chart of user authentication for a secure payment transaction.

The authentication/payment transaction processing in the example of FIG. 6 begins at step S1 in which the user operates the mobile device 11 to launch the Secure Payment application 231. Execution of the application programming 231 by the processor 202 configures the mobile device 11 to perform a number of secure payment-related functions.

In the example of FIG. 6, the mobile device receives a user input of a parameter of a desired financial transaction (at step S2), via a user interface element. As outlined above, the input parameter typically will be a transaction amount, input by virtual or physical key actuation or by speech command input or by user activation of a transceiver or the like of the device (e.g. NFC) to obtain the transaction amount from the merchant equipment. Of course other transaction parameters may be received in a similar manner, such as purchased item identifiers and/or a merchant identifier.

In step S3, the mobile device 11 may also collect one or more other parameters related to the current transaction, e.g. current location of the mobile device 11. The transaction request message sent to the transaction security processing server 29 includes an indication of the current location of the mobile device 11 that is attempting the payment transaction.

Although a variety of location technologies and/or location based services are known and may be involved in whole or in part to provide the location information, for purposes of this example, use of GPS technology by the mobile device 11 and inclusion of an appropriate location indicator (e.g. coordinates) for the current location are assumed. GPS is not always effective inside of a building, therefore if GPS satellite signals are not available at the point of the transaction, e.g. at the POS terminal location in the store, the mobile device 11 may use another location technique or may use the coordinates of the last GPS determination if sufficiently recent (no older than a set time period threshold).

In step S4, the mobile device 11 transmits the transaction parameter(s) and a user or device identification, via a wireless mobile transceiver (e.g. 109a or 11a), through a network for a server of a transaction service entity, such as the transaction security processing server 29. The parameters may be sent in one or more messages of an appropriate format, although for purposes of discussion of this example, transmission of the parameters in a transaction request message, e.g. in a secure format agreed upon as between the entity operating the server 29 and the financial institution is assumed. The identification typically identifies the user's mobile device 11, and several identifier examples are discussed elsewhere in this detailed description. Of note, however, the identification sent to the server 32 in the transaction request is an identification other than a financial account identifier.

On the server side, in this example at the server 29, programming in the memory of the server computer includes programming for the user authentication service for secure payment transactions. Typically, this programming is running and engaged in processing for other earlier transactions or in an idle state awaiting the next transaction request from a mobile device 11. Execution of the sever programming by the computer processor configures the computer to perform authentication functions in relation to a payment transaction. In the illustrated example, the functions include receiving one or more parameters of the user's desired financial transaction (e.g. amount and device location), in the transaction request message in the example, via a network and the communication interface of the server computer (step S5). Although receiving operations may be implemented as separate steps, in the illustrated example, the authentication request received in the transaction request in step S5 also includes the user or device identification.

For each valid customer enrolled for the relevant transaction services, the transaction security processing server 29 stores or has access to secure storage of an authentication file containing device identification information for the customer and/or their mobile device 11 and reference factors for the valid customer obtained during enrollment. As part of an authentication procedure, the transaction security processing server 29 identifies an authentication file based on the received identification. The identified authentication file corresponds the customer and thus generally corresponds to any financial account the customer has that is maintained by one or more of the financial transaction entities. The identified authentication file may point to the financial entity and/or the applicable server 32. The identified authentication file, however, does not specifically identify any particular financial account of the customer maintained by any financial transaction entity.

In a system in which the customers/users of mobile devices 11 may have accounts with different financial institutions but security is still provided by the system(s) 29 of the carrier, the server 29 identifies one of the financial institutions for each transaction. The server 29 accesses an authentication file indicated by the received device identification information, and the transaction security processing server 29 uses data from that file to obtain an identification of the financial institution that handles transactions for the valid user of the particular device 11. For example, the server 29 may access a mapping of the ESN or the MDN of the mobile device 11 to a routing address or other identification that points to the server 32 of the particular user's bank or the like.

A rule set for application to the current transaction processing is selected from among rule sets established by the identified financial institution, e.g. by selecting from among the rule sets corresponding to the address or other identification that points to the server 32 of the relevant financial institution. There is a selection of a rule set at the server 29, and there may be a selection of a rule set at the mobile device 11, depending on how communications between the server and mobile device are implemented, as outlined more fully below.

Returning to the processing on the mobile device side, after the transmission in step S4, processing advances to step S6. There, the mobile device prompts the user for and collects from the user some number (e.g. at least two) user authentication factors. In many of the examples, at least one of the user authentication factors is a biometric factor responsive to an input via the sensor, although in some cases, another factor or parameter (e.g. history) may be used instead of a biometric factor.

The Secure Payment application 231 may communicate with the server 29 to determine or obtain a rule set to apply to the current transaction or related instructions as to the factors that should be collected, although signaling communications for that purpose are omitted from the high level process flow chart of FIG. 6, for convenience. As an alternative, in our example, the Secure Payment application 231 may select one of several rule sets that are stored at the mobile device 11 for application to the transaction and thereby locally determine which factors to collect for purposes of processing the present financial transaction. For example, the Secure Payment application 231 in the mobile device 11 may have a minimum rule set to apply to obtain a number of user authentication factors at launch and/or for transactions up to a certain transaction value. In such an example, however, the Secure Payment application 231 in the mobile device 11 would have one or more additional rule sets, e.g. for application to one or more ranges of higher value transactions. A higher value rule set would cause the application to prompt the user and collect one or more additional user authentication factors different from those in the or in addition to those specified by the minimum rule set. Hence, the Secure Payment application 231 could pick a rule set and thus determine the factors to collect based on the transaction amount for the current financial transaction.

In either case, the Secure Payment Secure Payment application 231 may be configured to display icons when appropriate, in a manner to help prompt the device user to input each factor when called for by the applicable rule set. For example, when a selected rule set calls for a fingerprint input, the application 231 causes the mobile device 11 to show (and possibly flash) an icon of the fingerprint scanner, e.g. in combination with an image or animation of a finger being placed on that scanner. As another example of such a visual prompt, when a selected rule set calls for input of an image of the user's face, the Secure Payment application 231 causes the mobile device 11 to show (and possibly flash) an icon of a front facing camera, possible in combination with an icon or animation of a person facing the device camera 108 for image capture by that camera.

Although not shown, the Secure Payment Secure Payment application 231 may implement an input error handling procedure. For example, if there is a problem with entry of a required factor, e.g. a fingerprint scan, the application 231 may provide a prompt and allow the user to re-try the requisite factor input for a set number of times. If the input failure is sufficient to cause a complete transaction failure, the error handling procedure may change the applicable rule set and thus the factors and/or strictness of the factor analysis for any re-try attempts. As in other variations of the rule sets and their applications to different transactions, the change(s) for a re-try following an input error may depend on a variety of parameters, such as transaction amount, location, time, device/user etc.

In this example, the selected rule set determined the factors to be collected for user authentication purposes. The transaction amount and any other parameters collected in steps S2-S3 may also be determined by the rule set, for example, to provide different parameters for handling of different transactions of different values; although it may be simpler to collect a standard set of parameters, e.g. transaction amount, device location, time, date and merchant, for all user authentications for the secure transaction processing.

Assuming factor input is successful in step S6, the mobile device 11 has collected the appropriate user authentication factors for processing of the current financial transaction. Hence, in step S7, the mobile device 11 transmits the collected user authentication factors, using a wireless mobile transceiver (e.g. 109a or 11a), through a network, for a server of a transaction service entity, such as the transaction security processing server 29.

At step S8 on the server side, the server 29 receives the factor transmission from the mobile device 11 via the network and the communication interface at the server. The factor transmission includes the two or more user authentication factors obtained by the mobile device 11 from the current user of that mobile device, for authentication relative to the financial transaction. In the example, at least one of the received factors is a biometric factor, although in some cases, another factor or parameter (e.g. history) may be used instead of a biometric factor.

In step S9, the transaction security processing server 29 identifies a rule set, from among the rule sets of a particular financial transaction entity defining requirements for user authentications, based at least in part on the parameter(s) of the current financial transaction. The rule set used in step S6 determined the user authentication factors collected by the mobile device 11. The rule set selected in step S9 and used at the server in later steps determines the processing of the received factors in relation to corresponding reference factors, to determine whether the current user is the valid user. As a result, the rule sets and their use in the different steps may be somewhat different. If the server instructed the mobile device what factors to collect, there may only be one rule set used; whereas if the mobile device uses a locally stored rule set at the device, then that rule set is sufficiently complementary to the rule set identified by the server in step S9 so that the mobile device collects and transmits the appropriate factors for processing by the server.

Although shown as a single step for convenience, the rule set selection in step S9 may entail some number of sub-steps, particularly if the server provides authentication on behalf of a number of financial institutions.

As noted in the discussion of steps S4 and S5, the received transaction request message will include one or more identifications, such as the MDN and the ESN of the mobile device 11 involved in the current transaction. The server 29 can use any one or more of the received identifications to identify the financial institution and thus the rule sets from which to select one set for processing of the currently desired financial transaction. Having identified the appropriate financial institution and thereby that institution's rule sets, the transaction security processing server 29 uses one or more of the received parameters to select one of that institution's rule sets that the server 29 to apply to authenticate the user with respect to the present financial transaction. In the example, the particular rule set might be based on transaction amount, device location or some combination thereof. Other examples of rule set selections will be discussed in more detail later.

Based on the applicable rule set, the transaction security processing server 29 identifies one or more reference factors for authentication relative to the financial transaction. At least one identified reference factor corresponding to a valid user of the identified financial account and retrieves the identified factor(s) from the authentication file based on the received user or mobile device identification. Based on the device identifier in the transaction request, the transaction security processing server 29 retrieves the identified reference factor for the valid customer/user associated with the device 11.

The transaction security processing server 29 performs a comparison of one or more of the reference factors to the corresponding received user authentication factor(s), to determine in the current user of the mobile device is the valid customer for financial transaction purposes (step S10). Matching for all factors need not be perfect. A received passcode may need to match a reference passcode value exactly, but a fingerprint scan or facial image may only need to match a corresponding reference to a predetermined degree of certainty. For some transactions, the reference or degree of certainty may differ (e.g. be lower for lower value transactions), as specified by the applicable rule set selected in step S9.

If the factor matching is deemed insufficient under the current rule set, then the user authentication determination at S10 fails, indicating that the transaction security processing server 29 was unable to confirm that the current user is the valid customer (No branch from S10). Processing at S11 provides one or more error handling routines, such as reporting to the mobile device 11 and/or the merchant. If the parameters of the transaction, recent usage history and/or degree of the authentication failure warrant, then the transaction security processing server 29 may also institute a routine for saving data for and possibly reporting to an appropriate law enforcement agency.

Assume now that, at S10, the factor comparison at the transaction security processing server 29 authenticates the current user of the mobile device as the valid user based on a successful comparison of the one or more reference factors identified based on the second rule set to a corresponding one or more of the user authentication factors received for authentication relative to the first financial transaction (Yes branch from S10). In response to the authentication of the current user as the valid user, the transaction security processing server 29 (step S12) transmits data via the communication interface and the network of the server computer to enable completion of the first desired financial transaction with respect to a financial account of the customer maintained by the financial entity. This further transmission of data may take several different forms, depending on the equipment implementations and/or transactional arrangements between the involved enterprises and possibly the particular type of transaction to be completed. For discussion purposes, FIG. 6 shows several steps relating to a simplified further example.

In the example in FIG. 6, in response to successful authentication, the transaction security processing server 29 transmits a transaction message to the financial institution server 32, in step S12. This message includes the device authentication and the transaction amount and may include an identification of the merchant. Other parameters received from the mobile device, such as location, may be included. The transaction message is formatted or includes data so as to indicate the successful authentication of the user as the valid customer for the current financial transaction, typically a payment transaction. The financial institution server 32 receives the transaction message the transaction security processing server 29 in step S13.

To this point in the process, identification and user/customer related processing has been based on an identification obtained from the mobile device 11, without identifying a specific financial account of the customer that is to be used for the payment or other financial transaction. Hence, the next step S14 is to identify a financial account maintained by the entity corresponding to the received identification.

At the financial institution server 32, the server uses the identification of the mobile device 11 to identify the applicable user's financial account. The transaction message received in S13 included one or more identifications, such as MDN and the ESN of the mobile device 11 involved in the current transaction. The server 32 can use any one or more of the received identifications and may use a different identification for a different type of transaction, e.g. the MDN for a low value transaction or a transaction with a merchant or at a location that the user has frequented in the past and use the ESN for a higher value transaction or a transaction with a merchant or at a location that is relatively new for the particular device.

Based an identification of the applicable customer account and parameter(s) of the requested transaction, the financial institution server 32 determines whether or not the requested transaction is valid (step S15). The rules for this validation may be the same as or similar to rules that the financial institution applies to other transactions, e.g. not involving the secure payment service for customers using mobile devices 11. This transaction validation operation at S15, for example, may be similar to approval of a payment from a credit or debit account. By way of one specific example, for a requested payment transaction, the server 32 may determine if there are sufficient funds available on the account to cover the requested payment.

If the validation step at S15 fails (No branch), then the processing may initiate an appropriate error handling routine. Although not shown, this may involve sending notification of a transaction rejection to the customer's mobile device 11 and possibly to the merchant. If funds are insufficient, the notification message to the mobile device may provide an indication of the insufficiency for presentation to the device user, e.g. to allow the user to pay by cash or other means not dependent on the involved financial account.

Assume now that the analysis in step S15 determines that the requested transaction is valid (Yes branch) under the rules applicable to the customer's financial account, e.g. sufficient funds are available to make a requested payment. Hence, the server processing now extends to step 17, where the financial institution server 32 initiates one or more transmissions to implement the requested financial transactions.

In the example, the financial institution server 32 initiates a transmission to the merchant system(s) to implement a payment. This type of communication may be similar to credit or debit payments using existing card-based technologies. Although not shown in this process-flow example, some examples transmit a token to the mobile device to complete the transaction by transfer of the token to the POS terminal or to a website server.

In the example, the financial institution server 32 also initiates transmission in step S17 of a message to the mobile device 11, which is received at the device 11 in step S19. If the mobile device 11 presents information, such as a token, to complete payment for a purchase or the like, the message may include the requisite information, for example, in the form of a secure token. In an example like that shown, in which the server 32 completes payment via electronic transfer or the like through communications with the merchant's system, the message sent to the mobile device may merely confirm successful completion of the transaction (successful authentication for the desired transaction based on analysis of the collected user authentication factors and responsive completion of the payment or other financial transaction by the financial institution). From the mobile device and user's perspective, the process ends at S20, for example, with display or other output of confirmation (based on the received notification) that the payment transaction has been authorized.

Although not shown, as part of the transmissions at S17, the server 32, may also send a copy of the reference image of the user obtained from the database of the financial institution to the terminal of the merchant for display to the cashier or the like that is handling the user's transaction. In such an example, the cashier can then see the image and compare the image to the face of the person using the mobile device 11 for purposes of the current payment.

The carrier that provides mobile communication service to the device 11 has a variety of account holder information. For example, the carrier's records for the mobile device may include a billing address, payment history and possibly credit history (e.g. obtained during most recent account set-up or change). Where the transaction security processing service is offered by the carrier, the carrier's account information may be included or summarized in the records in server 28 and available for use in secure payment transaction processing by the server 29. For example, part of a location analysis as outlined above may relate to distance from the known billing address. As another example, a stricter authorization may be required at least in part in response to recent payment/collection problems and/or a poor credit score. A customer's account record at a carrier often covers multiple devices. Depending on the amount of information that may be available about the various devices under a given account (as recorded or accessible at the server 28), the server 29 may apply different standards for selecting rule sets to apply to payment transactions by users of the different devices under the one network services account. For example, the transaction value thresholds used to select more strict authentication rule sets may be higher for the device of the primary mobile-service account holder than for devices expected to be operated by other users on the account. Alternatively, the most stringent standard associated with the account may be applied for any transaction by any device associated with the account.

Figure 7:
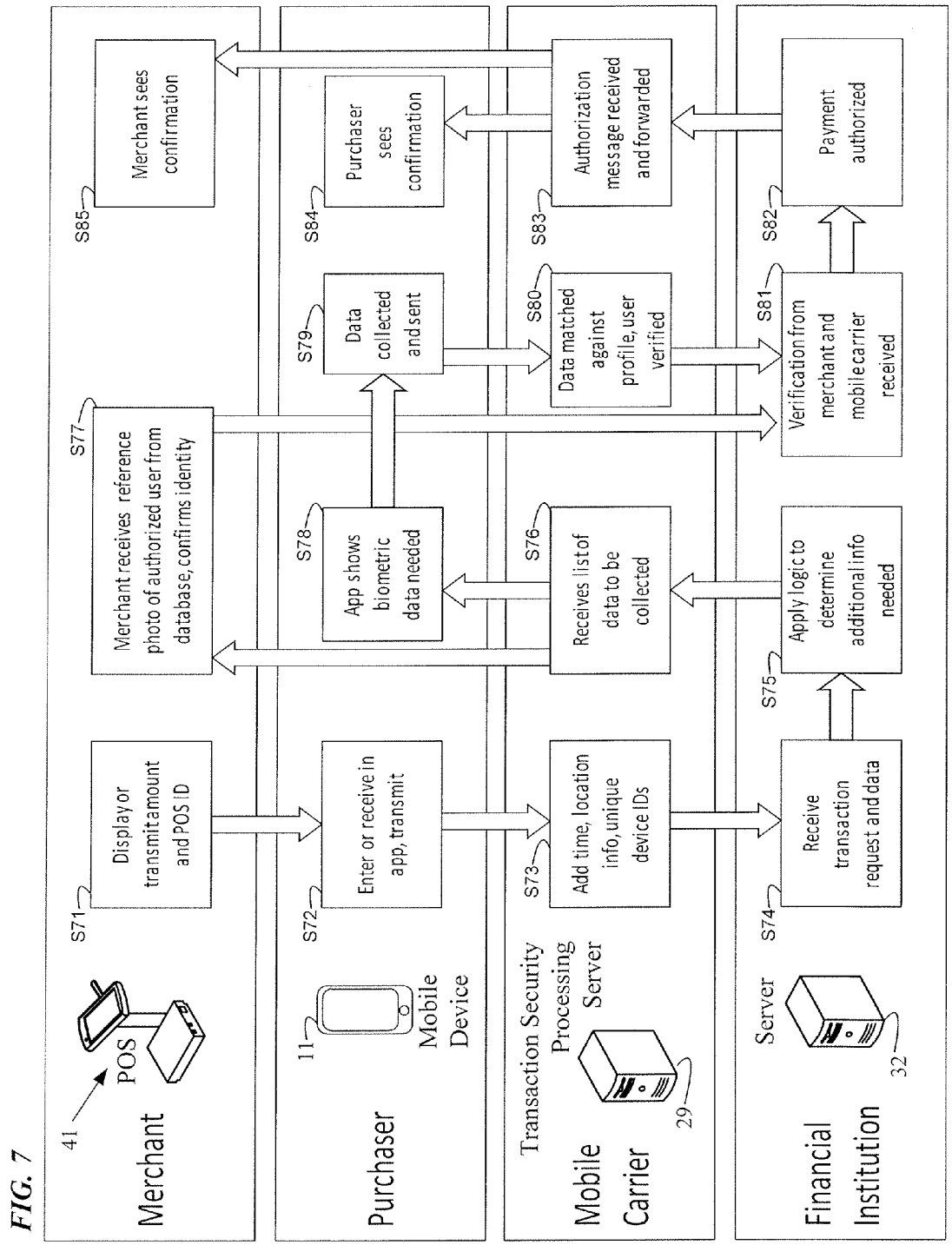
FIG. 7 is a flow chart of an example of a secure transaction procedure.

FIG. 7 is another flow chart, which represents an overall secure transaction procedure and presents a somewhat more detailed purchase transaction processing example, e.g. for a purchase at point of sale.

For discussion purposes, the drawing shows four entities involved in the transaction, the merchant, the purchaser, the mobile carrier that operates the network, and the financial institution that handles the purchaser's financial account against which the payment will be made. As noted earlier, the merchant may have a variety of different types of equipment to handle purchases, but for purposes of this example, the merchant has a POS terminal 41 like that discussed earlier. The purchaser is a user of a mobile device 11, like that shown I FIG. 2. Among other systems, the carrier will operate the transaction security processing server 29. The financial institution operates the server 32. In general, the POS terminal 41, mobile device 11, transaction security processing server 29 and financial institution server 32 operate and generally communicate as discussed above.

In a store or the like, the user identifies goods or services that she or he desires to purchase, and the POS terminal system 41 obtains information to determine an amount of payment required for the desired customer purchase. In step S71, the POS terminal 41 displays the purchase amount and an ID of the merchant to the purchaser or to a cashier or the like to read to the purchaser. Alternatively, the POS terminal system 41 may transmit the amount and merchant ID to the purchaser's mobile device 11, for example, via NFC, WiFi or Bloothtooth or via a mobile network communication.

The user launches the Secure Payment application 231 on the mobile device 231. In step S72, the user, or the transmission from the POS terminal system 41, enters the transaction amount and merchant ID into the Secure Payment application 231. The Secure Payment application 231 transmits the transaction amount and merchant ID to the transaction security processing server 29 of the mobile carrier. In the earlier example, the application 231 at the mobile device 11 included other relevant parameters, such as user and/or device identifier, time and location, in the transaction request. In this example, the carrier's network, either at the server 29 or by means of other mobile network elements, adds location information, one or more unique device identifiers and the time of the transaction, e.g. month, day, year and/or time of day (at S73).

The rule sets may reside at various locations. In the earlier example of FIG. 6, the transaction security processing server 29 stored rules sets provided by the financial institution; and is some variations, the Secure Payment application 231 in the mobile device 11 included at least some minimal aspects of rule sets. Such approaches may reduce network communication and possibly the overall time for transaction processing as may be apparent to the device user and thereby provide a faster service from the user's perspective. To improve security and/or ease of management of the rules of the various sets, however, the financial institution may prefer to keep the rule sets only in the institution's server 32. FIG. 7 shows a transaction processing of a type in which the rule sets reside only in the financial institution server 32 during the user authentication and transaction authorization procedure.

Hence, in this example, rule set selection entails server-to-server communications. To determine the applicable rule set and how to proceed based on that rule set, the carrier's transaction security processing server 29 transmits the data for the transaction accumulated to this point in the procedure to the financial institution server 32, and that data is received by the financial institution server 32 as a transaction request, in step S74.

At S75, the financial institution server 32 applies the internal logic of the server 32 to the data in the transaction request received in step S74. The analysis in step S75 may entail analyzing the data received with the transaction request to select the applicable one of the authentication rule sets based on the transaction parameters in a manner similar to the earlier examples. The financial institution server 32 uses the identified rule set to determine the additional information needed to process the requested financial transaction, in this example, the factors needed to authenticate the current device user as the valid customer for the payment to the merchant for the intended purchase.

From this analysis, the financial institution server 32 develops a list of additional information needed to process the transaction. In particular, the list indicates the user authentication factors to be collected. The financial institution server 32 sends the list, and the carrier's transaction security processing server 29 receives the list of additional data to be collected in step S76.

The transaction security processing server 29 stores reference data for comparison or other type of analysis of collected user authentication factors later in the process. One of the reference factors, however, is a previously collected image of the face of the valid customer. The reference factors are maintained in a database in the transaction security processing server 29, and the server 29 can transmit the valid customer image. In step S77, the merchant receives the reference photo of the authorized user from the database; and merchant personnel, such as the cashier at the point of sale, can confirm the identity of the user that is attempting to make the current purchase.

Returning to the transaction security processing server 29, that server has at this point in the procedure received the list of additional information to collect. In step S78, the purchaser's mobile device 11 receives a list of the data to collect from server 29. The received list indicates the user authentication factors; and the Secure Payment application 231 causes the device 11 to show the user the biometric input data (and any other data) needed for the user authentication. Although other forms of prompt may be used, in several of the examples described herein, the mobile device displays a series of icons as prompts to instruct the user to input the user authentication factors required for the present purchase transaction.

The mobile device 11 will collect at least two user authentication factors, and at least one of those factors obtained by the mobile device 11 is biometric. Examples of the collected factors include a passcode input, a user fingerprint, a user facial image, user speech input and a gestural input. In our example of FIG. 2, the touchscreen is used for input of the passcode, e.g. a PIN or a password. In addition to a traditional password or passcode input, the touchscreen may be used as a mechanism for input of one or more gestures for user authentication purposes. For example, the secure transaction application may be configured to collect a touching gesture input via the screen to allow the server 29 to compare that input factor to a corresponding gestural reference factor. In the example of FIG. 2, the mobile device 11 also included one or more sensors for detecting movement of the device, e.g. in the form of the MEMS 131. Motion sensing in turn may be detected for purposes of another authentication factor input. For example, another user authentication factor might be movement of the device in a particular gesture, such as a FIG. 8 or a combination of gestures, e.g. shake vertically, then FIG. 8, and then rotate about a specified axis. The microphone and vocoder may be used for a voice input, and the camera is available for input of one or more facial images as called for by an applied rule set.

Returning to the flow chart, the factors identified in the list from S76 are indicated to the user in S78 and collected by the purchaser's mobile device 11 in step S79. The mobile device 11 sends the collected data back to the carrier's transaction security processing server 29 as part of step S79.

In S80, the carrier's transaction security processing server 29 attempts to match the received data against corresponding reference factor data in a user profile associated with the identifier of the current user/purchaser's mobile device 11.

Matching need not be perfect for all types of factors. A passcode likely would need to match the corresponding reference code exactly. A fingerprint scan, voice print or facial image, however, would only need to match the corresponding reference factor to a degree that the financial institution deems sufficient for its account security purposes. The degree of precision of matching for one or more types of factors may vary among rule sets as applied in response to different transaction parameters. For purposes of this example, assuming that the carrier's transaction security processing server 29 determines that the collected factor data received from the mobile device 11 adequately matches the reference factors from its database to verify that the purchaser currently using the device 11 is the valid user of the financial account corresponding to the identified mobile device 11. At S80, upon verifying the user as valid, the carrier's transaction security processing server 29 informs the financial institution server 32 of successful user verification.

In step S81, the financial institution server 32 receives the user verification from the carrier's transaction security processing server 29. In this example, where the valid user's reference photo was sent to the merchant's POS terminal 41, the financial institution server 32 may also receive a user verification from the POS terminal 41, indicating that the cashier or the like observed the current user/purchaser and compared the user/purchaser to the reference photo and believes the user/purchaser to be the valid user. In response to receiving the applicable verification(s) at S81, the financial institution server 32 authorizes the requested payment (S82). Actual payment may be handled in a variety of ways, for example, in a manner similar to a debit or credit account payment to the merchant.

In step S83, the carrier's transaction security processing server 29 receives an authorization message indicating authorization of the requested payment, from the financial institution server 32; and the server 29 forwards that or corresponding messages to the purchaser's mobile device 11 (S84) and the merchant's POS terminal 41 (S85). In this way, both the purchaser and the cashier or the like of the merchant can see the successful payment for the purchase. The cashier can then operate the POS terminal 41 to complete the purchase in view of the successful payment transaction. Although not shown, the carrier's transaction security processing server 29 may keep records of transactions that it handles; and in the example, receipt of the authorization message at S83 allows the server 29 to note the successful completion in its record of the purchase transaction and store the record for further processing, e.g. as part of a transaction history for the particular mobile device 11.

Several of the examples above collected authentication factors but analyzed collected factors in different ways based on applicable rule sets. In some cases, analysis in comparison to reference factors was more precise for some transactions than when handling other transactions.

A low level transaction and/or a transaction at a frequently used merchant or purchase location represents low risk and therefore may not require full verification of all collected biometric factors. For example, user input of the relevant factors may indicate a general effort to comply and a simple factor verification, e.g. password, may be sufficient verification. As a slightly higher level authentication, the server 29 may determine that an image represents a human face and/or an input from a fingerprint scanner is a scan of a human finger, but not perform the full comparison to the reference factors to determine that the image is an image of the face of the account holder or that the fingerprint scanned in that of the account holder. In some such cases, the mere act of attempting to fulfill the biometric and/or factor verification requirements may be sufficient to authenticate the user. In other such cases, a minimal amount of matching data, e.g., only limited amount of matching a password may be deemed sufficient.

Matching for facial recognition via multiple images, for example, is stricter or more precise than similar recognition from one captured image, which is stricter or more precise than analyzing an image with respect to general reference parameters to determine that the image contains a human face. Similarly, speech or fingerprint recognition by matching to an acceptable degree relative to a corresponding reference factor from the valid user is more precise than analyzing a received audio input or scanner input to merely determine that the received datum represents human speech or a human fingerprint.

As outlined, different rule sets apply under different circumstances, and a variety of different parameters may be analyzed alone or in various combinations to determine which rule set to apply to each of many transactions handled by systems like those discussed herein. For example, different rule sets may apply for different locations of the mobile device when involved in transaction processing. In such an example, requirements of the rule sets differ as to the number of factors required to match and/or degree of matching of a factor, such that authentication for a transaction when the mobile device is at a location known from prior transaction processing resulting in a successful user authentication requires matching of fewer factors and/or less precise factor matching than for a transaction when the mobile device is at another location not known from prior transaction processing resulting in a successful user authentication.

In another example, outlined to some degree earlier, different rule sets may apply to different ranges of monetary transaction value. In such an example, requirements of the rule sets differ as to the number of factors required to match and/or degree of matching of a factor, such that authentication for a transaction having value in a higher transaction value range requires matching of more factors and/or more precise factor matching than for a transaction having value in a lower value transaction value range.

As yet another example, different rule sets may apply to different types of financial transactions, e.g. purchases at vending machines as opposed to purchases at retail point of sale, as compared to large transactions with potential liens (e.g. purchases of automobiles, boats, or property, or tax payments). In such an example, requirements of the rule sets differ as to the number of factors required to match and/or degree of matching of a factor, such that authentication for a first type (e.g. lower risk type) of financial transaction requires matching of more factors and/or more precise factor matching than for second type (e.g. higher risk type) of financial transaction of lower risk to the financial entity than the first type of financial transaction.

With the technical explanations above, it may be helpful now to consider several specific examples of transactions and the handling thereof using the user authentication technique for secure payment or the like, particularly from the perspective of the parties involved (with less emphasis on the communications and processing). A first such example relates to a medium value transaction, for example, a person buying building supplies at a lumber yard or hardware store.

The person chooses the present system as their method of payment for the goods they intend to purchase. The user opens their smartphone Secure Payment application 231 and verifies himself/herself based on rules set by the financial institution, for e.g. the application 231 tells the purchaser to use their thumb print and take a picture of their face. In this case, icons of a thumb and a face appear on the device 11 to prompt input of those authentication factors.

Using the location information for the mobile device 11, the Secure Payment application 231 already knows that it is the particular hardware store. The purchaser enters the purchase price in the application 213. The purchaser approves using a thumb print on their device's sensor, and holds the device so that their face can be photographed.

The user is authenticated as the valid user associated with a financial account for payment, in one or the ways discussed above. An image of the person's face taken on the mobile device 11 and a reference photo from a database are transmitted to the cashier with the amount paid. The cashier recognizes the person, the transaction is approved, and payment is made. After the transaction is complete, settlements are made between hardware store and the financial institution.

Consider next an example involving a high value transaction, such as for a customer who would like to transfer about $75,000 from their account with the financial institution account to Expensive Electric Motorcar Corporation to pay for a vehicle purchase. The financial institution has rules in place for transactions higher than $10,000. In this case, the Secure Payment application 231 displays icons for a thumbprint, a face, a passcode, a speech sample and a touch gesture. The location of the device is recorded from GPS, Bluetooth beacons or other technologies. The merchant or financial institution may require that the location be the car dealership affiliated with the Corporation, or a saved geographic location such as the user's home or office.

The user of the device manually enters the bank number and account number for Expensive Electric Motorcar Corporation to receive a wire transfer (not the user's own account information). The device user enters the agreed upon amount. The device user's thumbprint is used to start the transaction. The device user then moves the camera to capture his or her face from multiple angles. Verification based on multiple angles/images prevents spoofing with a photo of the person.

The Secure Payment application 231 prompts the user for verbal approval, and the mobile device user speaks "yes". Speaker verification is done on the device or in the cloud. The Secure Payment application 231 prompts the user for a known passcode and/or a gesture to be made on the touchscreen.

The transaction is confirmed, and the wire transfer is initiated. The wireless carrier may take a transaction fee.

A third transaction example involves a low value transaction. In this case, a customer would like to buy a pack of gum at a newsstand, e.g., in Grand Central station. According to rules of the applicable set established by the financial institution for low value transactions, the thumbprint is the primary authentication. The photo is recorded but only loosely used for authentication.

Since the location is a place that the mobile device user has been authenticated in before, the coordinates are logged and the location is considered an approved one. Likewise, the face is recorded and transmitted, but is not used to approve the transaction due to the low risk. Software on the device or in the cloud can verify that the photo is an image of a human face, but does not need to perform the match against the user of the phone. This reduced precision type factor matching speeds up the transaction processing.

By way of another example, the present secure transaction processing may be applicable to a purchase from an eCommerce website. In a sample of this scenario, a customer wants to purchase three pairs of shoes on-line from Zacme, and selects the present Secure Payment method.

After filling out their mailing information, etc. on the Zacme website, the customer opens the Secure Payment application 231 on their mobile phone 11. He or she indicates the website name and the amount he or she would like to pay. The customer is verified using methods such as thumb print, facial recognition, etc., as in one or more of the earlier examples.

Upon approval, a unique transaction code is transmitted to the web site ecommerce merchant (Zacme) and the customer's mobile phone. The user enters this unique transaction code on the website, and the payment is complete. Zacme confirms the order since it is able to match the transaction code. Billing happens by the wireless carrier, or through a financial institution linked to the customer's mobile device 11.

Hence, aspects of the methods of user authentication for secure payment transactions outlined above may be embodied in programming, for example, for one or more server and/or for mobile devices. Program aspects of the technology may be thought of as "products" or "articles of manufacture" typically in the form of executable code and/or associated data that is carried on or embodied in a type of machine readable medium. Executable code, for example, may take the form of software, firmware, microcode or the like the type suitable for execution by the particular processor hardware of the mobile device, other user terminal device or server platform, so as to configure the respective equipment to perform functions like those discussed herein.

"Storage" type media include any or all of the tangible memory of the computers, mobile devices, processors or the like, or associated modules thereof, such as various semiconductor memories, tape drives, disk drives and the like, which may provide non-transitory storage at any time for the programming. All or portions of the programming may at times be communicated through the Internet or various other telecommunication networks. Such communications, for example, may enable loading of the software from one computer or processor into another, for example, from a management server or host computer of the carrier or other enterprise offering the secure payment transaction processing service into the computer platform of the server 29 or downloading the Secure Payment application 231 into the mobile device 11. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s), mobile devices or the like, such as may be used to implement the secure payment processing techniques discussed herein. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer, comprising:
   a network communication interface;
   a processor;
   a memory accessible to the processor; and
   programming in the memory, wherein execution of the programming by the processor configures the computer to perform functions, including functions to:
   receive a parameter of a first financial transaction via a network and the communication interface;
   receive a user or device identification, other than a financial account identifier, from a mobile device via the network and the communication interface;
   receive, from the mobile device via the network and the communication interface, at least two user authentication factors obtained by the mobile device from a current user of the mobile device for authentication relative to the first financial transaction, at least one of the received factors being a biometric factor;
   based at least in part on the parameter of the first financial transaction, identify a first rule set, from among a plurality of rule sets of a financial transaction entity defining requirements for user authentications;
   identify an authentication file based on the received identification, the authentication file corresponding to but not including an identification of any financial account maintained by the financial transaction entity corresponding to the received identification;
   based on the first rule set, obtain one or more reference factors from the identified authentication file for authentication relative to the first financial transaction, at least one obtained reference factor corresponding to a valid user of the corresponding financial account;
   authenticate the current user of the mobile device as the valid user based on a successful comparison of the one or more obtained reference factors to a corresponding one or more of the user authentication factors received for authentication relative to the first financial transaction; and
   in response to the authentication of the current user as the valid user, transmit data via the communication interface and the network to enable completion of the first financial transaction with respect to the corresponding financial account by the financial entity.

2. The computer of claim 1, wherein:
   execution of the programming by the processor configures the computer to perform a further function to store data regarding, transaction parameters, factors used or activities of the mobile device from processing of financial transactions involving the corresponding financial account to form a transaction history relative to the mobile device or user; and
   at least one difference between requirements of the rule sets is based on the transaction history.

3. The computer of claim 1, wherein:
execution of the programming by the processor configures the computer to perform a further function to store data regarding activities of the mobile device to form a history relative to the mobile device or user, at least some of the activities of the mobile device occurring at times when the mobile device is not involved in processing of any financial transaction; and
at least one difference between requirements of the rule sets is based on the history.

4. The computer of claim 1, wherein execution of the programming by the processor configures the computer to perform further functions, including functions to:
receive, via the network and the communication interface, a parameter of a second financial transaction different from the parameter of the first financial transaction;
receive, from the mobile device via the network and the communication interface, two user authentication factors obtained by the mobile device from a current user of the mobile device for authentication relative to the second financial transaction, at least one of the received factors received the second financial transaction being a biometric factor;
based at least in part on the parameter of the second financial transaction, identify a second rule set, from among the plurality of rule sets of the financial transaction entity defining requirements for user authentication, the requirements defined by the second rule set being different from the requirements defined by the first rule set;
based on the second rule set, identify one or more reference factors for authentication relative to the second financial transaction, at least one reference factor identified based on the second rule set corresponding to the valid user of the corresponding financial account;
authenticate the current user of the mobile device as the valid user based on a successful comparison of the one or more reference factors identified based on the second rule set to a corresponding one or more of the user authentication factors received for authentication relative to the second financial transaction; and
in response to the authentication of the current user as the valid user using the second rule set, transmitting data via the communication interface and the network to complete the second financial transaction with respect to the corresponding financial account.

5. The computer of claim 4, wherein:
the first and second rule sets apply to different ranges of monetary transaction value; and
the requirements of the first and second rule sets differ as to a number of factors required to match and/or degree of matching of a factor, such that authentication for a transaction having value in a higher transaction value range requires matching of more factors and/or more precise factor matching than for a transaction having value in a lower value transaction value range.

6. The computer of claim 4, wherein:
the first and second rule sets apply to different locations of the mobile device when involved in transaction processing; and
the requirements of the first and second rule sets differ as to a number of factors required to match and/or degree of matching of a factor, such that authentication for a transaction when the mobile device is at a location known from prior transaction processing resulting in a successful user authentication requires matching of fewer factors and/or less precise factor matching than for a transaction when the mobile device is at another location not known from prior transaction processing resulting in a successful user authentication.

7. The computer of claim 4, wherein:
the first and second rule sets apply to different types of financial transactions; and
the requirements of the first and second rule sets differ as to a number of factors required to match and/or degree of matching of a factor, such that authentication for a first type of financial transaction requires matching of more factors and/or more precise factor matching than for second type of financial transaction of lower risk to the financial entity that the first type of financial transaction.

8. The computer of claim 4, wherein:
the first and second rule sets apply to different conditions in relation to historical usage of the mobile device in financial transactions; and
the requirements of the first and second rule sets differ as to a number of factors required to match and/or degree of matching of a factor, such that authentication for a financial transaction corresponding to a historical record of financial transactions involving the mobile device requires matching of fewer factors and/or less precise factor matching than for a transaction that does not correspond to a historical record of financial transactions involving the mobile device.

9. The computer of claim 4, wherein:
the first and second rule sets apply to different conditions in relation to historical usage of the mobile device for non-transactional device usage; and
the requirements of the first and second rule sets differ as to a number of factors required to match and/or degree of matching of a factor, such that authentication for a financial transaction when recent usage of the mobile device for non-transactional device usage conforms to one or more aspects of the usage of the mobile device for non-transactional device usage requires matching of fewer factors and/or less precise factor matching than for a transaction when recent usage of the mobile device for non-transactional device usage deviates from one or more aspects of the usage of the mobile device for non-transactional device usage.

10. The computer of claim 1, wherein:
each of the two user authentication factors obtained by the mobile device is a factor from the following group: a user fingerprint, a user facial image, user speech input, a gestural input, and a passcode input; and
the identification is an identification of the mobile device from the following group: an electronic serial number (ESN), a mobile equipment identifier (MEID), an international mobile subscriber identity (IMSI), and a media access control (MAC) address.

11. The computer of claim 1, wherein:
the computer is a computer of a mobile network operator;
the programming configures the computer of the mobile network operator to transmit the data to a computer system of the financial entity to initiate a payment from the corresponding financial account to an account of a merchant; and
the data transmitted to the computer system of the financial entity includes the received identification but not an identification of the corresponding financial account.

12. The computer of claim 1, wherein:
the computer is a computer of the financial entity; and
the programming configures the computer of the financial entity to identify the corresponding financial account based on the received identification and transmit the data to effectuate transfer of funds from the identified financial account to make a payment to an account of a merchant.

13. The computer of claim 1, wherein:

the computer stores an image of the valid user of the corresponding financial account for possible use as a reference factor; and the execution of the programming by the processor configures the computer to perform a further function to transmit the image of the valid user to a merchant's terminal device at a location at which the current user of the mobile device requested the first financial transaction.

14. A mobile device, comprising:

a wireless mobile transceiver;

at least one user interface element configured to receive a user input and to provide information output to the user;

a sensor for a biometric input of a user;

a processor;

a memory accessible to the processor; and programming in the memory, wherein execution of the programming by the processor configures the mobile device to perform functions, including functions to:

receive a user input of a parameter of a desired financial transaction, via the at least one user interface element;

transmit the parameter and a user or device identification other than a financial account identifier, via the wireless mobile transceiver through a network for a server of a transaction service entity;

prompt the user for and collect from the user two or more user authentication factors, at least one of the user authentication factors being a biometric factor responsive to an input via the sensor;

transmit the collected user authentication factors, via the wireless mobile transceiver through the network for the server of the transaction service entity; and receive notification of successful authentication for the desired financial transaction based on analysis of the collected user authentication factors according to an authentication rule set of the transaction service entity to the parameter of the desired financial transaction, in relation to corresponding valid user authentication factors for a financial account associated with the user or the mobile device, from the server through the network via the wireless mobile transceiver.

15. The mobile device of claim 14, wherein:

each of the two or more user authentication factors obtained by the mobile device is a factor from the following group: a user fingerprint, a user facial image, user speech input, a gestural input, and a passcode input; and the identification is an identification of the mobile device from the following group: an electronic serial number (ESN), a mobile equipment identifier (MEID), an international mobile subscriber identity (IMSI), and a media access control (MAC) address.

16. The mobile device of claim 14, wherein:

the at least one user interface element comprises a display; and the function to prompt the user for the two or more user authentication factors comprises:

showing on the display a first distinctive icon indicating a first type of user input for a first of the factors; and showing on the display a second distinctive icon indicating a second type of user input for a second of the factors, the second distinctive icon being different from the first distinctive icon.

17. The mobile device of claim 14, wherein execution of the programming by the processor configures the mobile device to perform functions, including functions to:

receive a user input of another parameter of another financial transaction, via the at least one user interface element;

transmit the other parameter and the user or device identification other than a financial account identifier, via the wireless mobile transceiver through the network for the server of the transaction service entity;

prompt the user for and collect from the user two or more user authentication factors for the other financial transaction, at least one of the user authentication factors for the other financial transaction being different from the user authentication factors for the desired financial transaction and at least one of the user authentication factors for the other financial transaction being a biometric factor responsive to an input via the sensor;

transmit the collected user authentication factors for the other financial transaction, via the wireless mobile transceiver through the network for the server of the transaction service entity; and receive notification of successful authentication for the other financial transaction based on analysis of the collected user authentication factors for the other financial transaction according to an authentication rule set of the transaction service entity to the parameter of the desired financial transaction, in relation to corresponding valid user authentication factors for a financial account associated with the user or the mobile device, from the server through the network via the wireless mobile transceiver.

18. The mobile device of claim 17, further comprising:

rule sets stored in the memory, each respective rule set specifying two or more user authentication factors and a basis for applying the respective rule set;

wherein execution of the programming by the processor further configures the mobile device to:

select and apply a first of the rule sets so as to prompt for and collect user inputs for the user authentication factors for the desired financial transaction when a parameter related to the desired financial transaction satisfies a basis for applying the first rule set;

select and apply a second of the rule sets so as to prompt for and collect user inputs for the user authentication factors for the other financial transaction when a parameter related to the other financial transaction satisfies a basis for applying second rule set; and the parameter related to the other financial transaction is different from the parameter related to the desired financial transaction.

19. The mobile device of claim 17, wherein execution of the programming by the processor further configures the mobile device to:

collect user inputs for the user authentication factors for the desired financial transaction in response to a first instruction received from the server based on the transmitted transaction parameter of the desired financial transaction; and collect user inputs for the user authentication factors for the other financial transaction in response to a second instruction received from the server based on the transmitted parameter of the other financial transaction.

* * * * *